United States Patent
Nahmias

(10) Patent No.: US 12,032,210 B2
(45) Date of Patent: Jul. 9, 2024

(54) METHOD OF OPTICAL MODULATION FOR PHOTONIC COMPUTING

(71) Applicant: Luminous Computing, Inc., Menlo Park, CA (US)

(72) Inventor: Mitchell A. Nahmias, Menlo Park, CA (US)

(73) Assignee: Luminous Computing, Inc., Santa Clara, CA (US)

( * ) Notice: Subject to any disclaimer, the term of this patent is extended or adjusted under 35 U.S.C. 154(b) by 17 days.

(21) Appl. No.: 17/881,507

(22) Filed: Aug. 4, 2022

(65) Prior Publication Data

US 2022/0381990 A1   Dec. 1, 2022

Related U.S. Application Data

(60) Continuation of application No. 16/848,429, filed on Apr. 14, 2020, now Pat. No. 11,442,228, which is a
(Continued)

(51) Int. Cl.
| | | |
|---|---|---|
| *G02B 6/293* | (2006.01) | |
| *G02B 6/42* | (2006.01) | |
| *G06E 3/00* | (2006.01) | |
| *H04B 10/70* | (2013.01) | |
| *H04J 14/02* | (2006.01) | |

(52) U.S. Cl.
CPC ....... *G02B 6/29355* (2013.01); *G02B 6/4215* (2013.01); *G06E 3/008* (2013.01); *H04B 10/70* (2013.01); *H04J 14/02* (2013.01)

(58) Field of Classification Search
CPC .......... G02B 5/20; G02B 5/201; G02B 5/207; G02B 6/12; G02B 6/12007; G06E 1/00; G06E 1/02; G06E 1/04; G06E 1/045; G06E 1/06; G06E 1/065; G06E 3/00; G06E 3/001; G06E 3/005; G06E 3/006; G06E 3/008; G02F 3/00; G02F 3/02; G02F 3/022; G02F 3/024; G02F 3/026; G02F 3/028; G02F 1/00
USPC ......... 359/107, 108; 385/1, 2, 3, 4, 8, 9, 10, 385/14, 129, 130, 131, 132, 147
See application file for complete search history.

(56) References Cited

U.S. PATENT DOCUMENTS

| | | |
|---|---|---|
| 5,138,677 A | 8/1992 | Oshaughnessy et al. |
| 6,137,604 A | 10/2000 | Bergano |
| | | (Continued) |

OTHER PUBLICATIONS

Clements, William R., et al., "Optimal design for universal multiport interferometers", Optica, vol. 3, No. 12, Dec. 2016, 6 pages.
(Continued)

*Primary Examiner* — Arnel C Lavarias
(74) *Attorney, Agent, or Firm* — Stratford Group Ltd.

(57) ABSTRACT

A system for photonic computing, preferably including an input module, computation module, and/or control module, wherein the computation module preferably includes one or more filter banks and/or detectors. A photonic filter bank system, preferably including two waveguides and a plurality of optical filters optically coupled to one or more of the waveguides. A method for photonic computing, preferably including controlling a computation module, controlling an input module, and/or receiving outputs from the computation module.

18 Claims, 18 Drawing Sheets

Related U.S. Application Data division of application No. 16/672,231, filed on Nov. 1, 2019, now Pat. No. 10,656,336.

(60) Provisional application No. 62/757,647, filed on Nov. 8, 2018.

(56) References Cited

U.S. PATENT DOCUMENTS

| | | | |
|---|---|---|---|
| 6,212,315 B1* | 4/2001 | Doerr | H04J 14/0206 385/39 |
| 6,417,965 B1 | 7/2002 | Ye et al. | |
| 6,452,681 B1 | 9/2002 | Carver et al. | |
| 6,529,276 B1 | 3/2003 | Myrick | |
| 6,825,963 B2 | 11/2004 | Kittaka et al. | |
| 7,005,669 B1 | 2/2006 | Lee | |
| 7,113,705 B2 | 9/2006 | Carrick et al. | |
| 7,206,477 B2 | 4/2007 | Madsen | |
| 7,298,949 B2 | 11/2007 | Gothoskar et al. | |
| 7,310,454 B2 | 12/2007 | Akiyama et al. | |
| 7,310,468 B2 | 12/2007 | Kittaka et al. | |
| 7,333,732 B2 | 2/2008 | Domagala | |
| 7,421,168 B1 | 9/2008 | Goutzoulis | |
| 7,421,179 B1 | 9/2008 | Jiang et al. | |
| 7,474,408 B2 | 1/2009 | Alphonse | |
| 7,747,176 B2 | 6/2010 | Domagala | |
| 8,027,587 B1 | 9/2011 | Watts | |
| 8,953,950 B2 | 2/2015 | Nazarathy et al. | |
| 9,176,361 B2 | 11/2015 | Sartor et al. | |
| 9,197,471 B1 | 11/2015 | Zanoni et al. | |
| 9,407,369 B2 | 8/2016 | Yu | |
| 9,496,964 B2 | 11/2016 | Sinsky et al. | |
| 9,831,957 B2 | 11/2017 | Abiri et al. | |
| 10,009,135 B2 | 6/2018 | Tait et al. | |
| 10,133,141 B2 | 11/2018 | Evans et al. | |
| 10,454,580 B2 | 10/2019 | Gu et al. | |
| 10,656,336 B1* | 5/2020 | Nahmias | G02B 6/4215 |
| 10,670,860 B2 | 6/2020 | Tait et al. | |
| 10,763,974 B2 | 9/2020 | Bunandar et al. | |
| 10,803,259 B2 | 10/2020 | Kenney et al. | |
| 11,143,822 B1 | 10/2021 | Nahmias et al. | |
| 11,442,228 B2* | 9/2022 | Nahmias | H04J 14/021 |
| 2004/0027646 A1 | 2/2004 | Miller et al. | |
| 2004/0114929 A1* | 6/2004 | Madsen | H04J 14/0298 398/79 |
| 2004/0170351 A1 | 9/2004 | Fishman et al. | |
| 2004/0184711 A1 | 9/2004 | Bradley et al. | |
| 2005/0117916 A1 | 6/2005 | Kropp et al. | |
| 2005/0259999 A1 | 11/2005 | Covey | |
| 2006/0067696 A1 | 3/2006 | Kai | |
| 2007/0052498 A1 | 3/2007 | Pan et al. | |
| 2007/0212076 A1 | 9/2007 | Roberts et al. | |
| 2007/0230871 A1 | 10/2007 | Bidnyk et al. | |
| 2010/0156679 A1 | 6/2010 | Ehrlichman et al. | |
| 2010/0296775 A1 | 11/2010 | Png et al. | |
| 2011/0044573 A1 | 2/2011 | Shastri et al. | |
| 2011/0234435 A1 | 9/2011 | Woodward et al. | |
| 2012/0197094 A1 | 8/2012 | Zhang et al. | |
| 2013/0251300 A1 | 9/2013 | Suzuki et al. | |
| 2014/0366647 A1 | 12/2014 | Steinhardt et al. | |
| 2015/0316794 A1 | 11/2015 | Hayakawa | |
| 2016/0047988 A1 | 2/2016 | Liu et al. | |
| 2016/0139487 A1 | 5/2016 | Popovic et al. | |
| 2017/0038609 A1 | 2/2017 | Luo et al. | |
| 2017/0176779 A1 | 6/2017 | Hauenschild et al. | |
| 2017/0214472 A1 | 7/2017 | Caplan et al. | |
| 2017/0222400 A1 | 8/2017 | Taylor | |
| 2017/0336564 A1 | 11/2017 | Soref | |
| 2018/0205465 A1 | 7/2018 | Tanaka et al. | |
| 2019/0187380 A1 | 6/2019 | Fanto et al. | |
| 2019/0199060 A1 | 6/2019 | Parker et al. | |
| 2019/0331912 A1 | 10/2019 | Tait et al. | |
| 2020/0249472 A1 | 8/2020 | Tait et al. | |
| 2020/0285084 A1 | 9/2020 | Ji et al. | |
| 2021/0336414 A1 | 10/2021 | Harris | |

OTHER PUBLICATIONS

Darmawan, S., et al., "Nested ring Mach-Zehnder interferometer", Optics Express, vol. 15, No. 2, Jan. 22, 2007.

Dubé-Demers, Raphaël, et al., "Low-power DAC-less PAM-4 transmitter using a cascaded microring modulator", vol. 41, No. 22, Optics Letters / Nov. 15, 2016.

Gao, Jing, et al., "Multi-function Mach-Zehnder modulator forpulse shaping and generation", vol. 24, No. 19 | Sep. 19, 2016 | Optics Express 22239.

Govdeli, Alperen, et al., "Integrated Optical Modulator Based on Transition between Photonic Bands", Scientific Reports, Jan. 26, 2018, (2018) 8:1619, DOI:10.1038/s41598-018-20097-7.

Gutierrez, A.M., et al., "Ring-Assisted Mach-Zhnder Interferometer Silicon Modulator for Enhanced Performance", Journal of Lightwave Technology, vol. 30, No. 1, Jan. 1, 2012, 6 pages.

Hai, Mohammed Shafiqul, et al., "A Ring-Based 25 GB/s DAC-Less PAM-4 Modulator", IEEE Journal of Selected Topics in Quantum Electronics, vol. 22, No. 6, Nov./Dec. 2016.

Jin, Weiliang, et al., "Inverse Design of Compact Multimode Cavity Couplers", Optics Express, vol. 26, Issue 20, pp. 26713-26721 (2018).

Khilo, Anatol, et al., "Photonic ADC: overcoming the bottleneck of electronic jitter", Feb. 13, 2012 / vol. 20, No. 4 / Optic Express.

Kim, Hyeongpin, et al., "ailorable and Broadband On-Chip Optical Power Splitter", Appl. Sci. Oct. 10, 2019, 9, 4239; doi:10.3390/app9204239.

Kocaman, S., et al., "Zero phase delay in negative-refractive-index photonic crystal superlattices", Nature Photonics, vol. 5, Aug. 2011, www.nature.com/naturephotonics.

Konishi, Tsuyoshi, et al., "Five-bit parallel operation of optical quantization and coding for photonics analog-to-digital conversion", Aug. 15, 2011 / vol. 19, No. 17 / Optics Express.

Le, Trung-Thanh, "New Approach to Mach-Zehnder Interferometer (MZI) Cell Based on Silicon Waveguides for Nanophonic Circuits", IntechOpen, 2018, Chapter 3, pp. 31-46, 16 pages.

Lu, Liangjun, et al., "Low-power 2X2 silicon electro-optic switches based on double-ring assisted Mach-Zehnder Interferometers", Optic Letters, vol. 39, No. 6, Mar. 15, 2014, 4 pages.

Moazeni, Sajjid, et al., "A 40-GB/s PAM-4 Transmitter Based on a Ring-Resonator Optical DAC in a 45-nm SOI CMOS", IEEE Journal of Solid-State Circuits, vol. 52, No. 12, Dec. 2017, 14 pages.

Nicholl, Gary, et al., "PAM-16 Implementation Update", IEEE 802.3 NG100GE Optics Study Group Minneapolis, May 2012.

Park, Anthony H.K., et al., "Comparison of DAC-less PAM4 Modulation in Segmented Ring Resonator and Dual Cascaded Ring Resonator", Department of Electrical Engineering, 978-1-5090-5016-1/17/$31.00 @2017 IEEE, 2 pages.

Richardson, Julian, et al., "Flexible Generation of Kalman Filter Code", NASA Technical Reports Server (NTRS), Jan. 1, 2006.

Rosenberg, J.C., et al., "A 25 Gbps silicon microring modulator based on an interleaved junction", Nov. 19, 2012 / vol. 20, No. 24 / Optics Express.

Settle, Michael, et al., "Low loss silicon on insulator photonic crystal waveguides made by 193nm optical lithography", Mar. 20, 2006, vol. 14, No. 6, Optics Express 2440.

Shainline, Jeffrey M., et al., "Depletion-mode carrier-plasma optical modulator in zero-change advanced CMOS", Aug. 1, 2013 / vol. 38, No. 15 / Optics Letters.

Shen, Yichen, et al., "Deep learning with coherent nanophotonic circuits", Nature Photonics, published online Jun. 12, 2017 | DOI: 10.1038/NPHOTON.2017.93.

Shen, Yichen, et al., "Deep learning with coherent nanophotonic circuits", Supplementary Information, Nature Photonics, 2017, DOI: 10.1038/NPHOTON.201.

Shile, Wei, et al., "Multimode interference coupler based photonics analog-to-digital conversion scheme", Sep. 1, 2012 / vol. 37, No. 17 / Optics Letters.

Song, Junfeng, et al., "Passive ring-assisted Mach-Zehnder interleaver on silicon-on-insulator", Optics Express, vol. 16., No. 12 Jun. 9, 2008, 7 pages.

Tait, Alexander N., "Broadcast and Weight: An Integrated Network for Scalable Photonic Spike Processing", Journal of Lightwave

(56) References Cited

OTHER PUBLICATIONS

Technology. vol. 32 No. 21, Nov. 1, 2014.
Tait, A.N., et al., "Microring Weight Bank Designs with Improved Channel Density and Tolerance", IEEE, 978-1-5090-6577, 2017, pp. 101-102.
Tait, Alexander N., et al., "Two-pole microring weight banks", Optics Letters, vol. 43, No. 10, May 15, 2018, pp. 2276-2279.
Timurdogan, Erman, et al., "An Interior-Ridge Silicon Microring Modulator", Journal of Lightwave Technology, vol. 31, No. 24, Dec. 15, 2013, 8 pages.
Timurdogan, Erman, et al., "An Ultralow power athermal silicon modualor", Nature Communications, DOI: 10.1038/ncomms5008, published Jun. 11, 2014, 11 pages.
Valley, George C., "Photonic analog-to-digital converters", Mar. 5, 2007 / vol. 15, No. 5 / Optics Express.
Xiao, Xi, et al., "44-GB/s Silicon Microring Modulators Based on Zigzag PN Junctions", IEEE Photonics Technology Letters, vol. 24, No. 19, Oct. 1, 2012, 3 pages.

\* cited by examiner

METHOD OF OPTICAL MODULATION FOR PHOTONIC COMPUTING

CROSS-REFERENCE TO RELATED APPLICATIONS

This application is a continuation of U.S. patent application Ser. No. 16/848,429 filed on 14 Apr. 2020, which is a divisional of U.S. patent application Ser. No. 16/672,231 filed on 1 Nov. 2019, which claims the benefit of U.S. Provisional Application Ser. No. 62/757,647 filed on 8 Nov. 2018, each of which is incorporated in its entirety by this reference.

TECHNICAL FIELD

This invention relates generally to the photonic computing field, and more specifically to a new and useful system and method for photonic computing.

BACKGROUND

Typical photonic filter bank systems may suffer from high noise, detuning due to temperature changes, and/or other effects that reduce filter bank performance. Thus, there is a need in the photonic computing field to create a new and useful system and method for photonic computing.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System

Figure 1A:
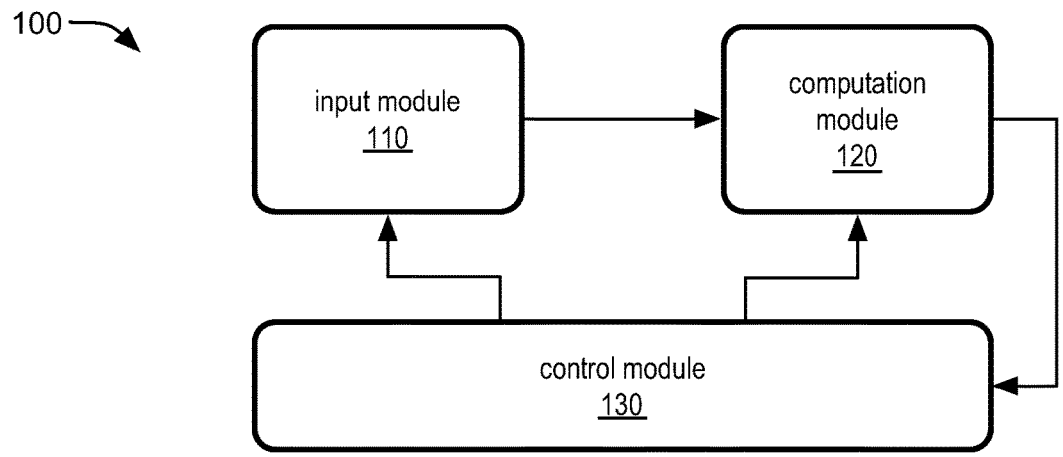
FIGS. 1A-1B are schematic representations of an embodiment of the system and an example of the embodiment, respectively.
Figure 1B:
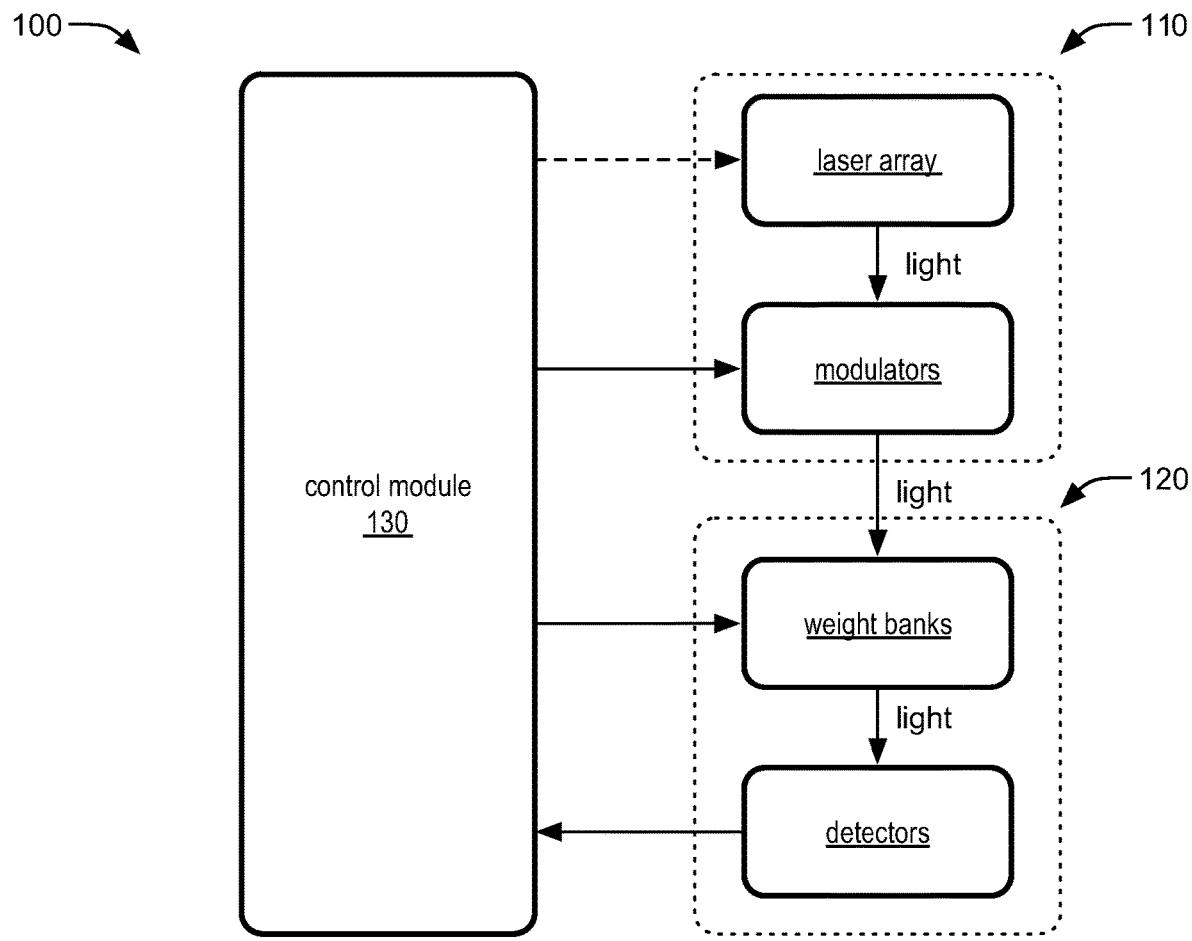

A system 100 for photonic computing preferably includes an input module 110, computation module 120, and/or control module 130 (e.g., as shown in FIGS. 1A-1B). In some embodiments, the system includes one or more elements such as described in U.S. Pat. No. 10,009,135, issued 26 Jun. 2018 and titled "System and Method for Photonic Processing", which is hereby incorporated in its entirety by this reference. However, the system can additionally or alternatively include any other suitable elements.

The system and/or elements thereof are preferably implemented as one or more integrated circuits. For example, the photonic modules (e.g., input module, computation module) and/or subsets thereof can be and/or include one or more photonic integrated circuits, and/or the entire system can be a portion of a single integrated circuit. However, the system can additionally or alternatively be implemented in any other suitable device structure(s).

1.1 Input Module

The input module no preferably functions to generate a photonic representation of an input signal. The input signal is preferably representative of an input vector (e.g., encodes the input vector). The input module preferably includes one or more transducers and a multiplexer, and can additionally or alternatively include any other suitable elements.

1.1.1 Transducers

The transducers preferably function to control light emission at various wavelengths. The input module preferably includes a plurality of transducers. Each transducer preferably controls a different emission channel (e.g., wavelength channel, mode channel, etc.). For example, each transducer can control a different emission channel near (e.g., within a threshold distance of, substantially centered around, etc.) the 1.3 micron and/or 1.55 micron wavelength (e.g., within the 1.26-1.36 micron O-band, within the 1.53-1.565 micron C-band and/or the 1.565-1.625 micron L-band, etc.), wherein the wavelengths described herein preferably refer to the wavelength the light would have in free space, rather than to the wavelength of the light in the medium through which it is propagating. The wavelength channels are preferably narrow-band channels, such as channels of less than a threshold bandwidth (e.g., 1, 2, 5, 10, 15, 25, 40, 65, 100, 200, 500, 1000 GHz, 1-5, 5-20, 20-100, 100-300, and/or 300-1000 GHz frequency bandwidth; 0.01, 0.02, 0.05, 0.1, 0.2, 0.5, 1, 2, 5, 10, 0.01-0.05, 0.05-0.2, 0.2-1, 1-3, or 3-10 nm spectral bandwidth; etc.), but can additionally or alternatively include intermediate- and/or wide-band channels and/or channels of any other suitable widths. The channels can additionally or alternatively be associated with optical modes (e.g., transverse spatial modes, polarization modes, etc.) and/or any other suitable optical characteristics. Alternatively, a single transducer can control multiple emission channels, and/or the transducers can emit light of any other suitable wavelength(s) and/or other optical characteristics. Each channel preferably corresponds to a different element of the input vector.

The channels are preferably non-overlapping, more preferably having at least (and/or at most) a threshold spacing (e.g., threshold amount relative to the channel width, such as 5, 10, 25, 50, 100, 110, 125, 150, 175, 200, 250, 300, 400, 500, 0-1, 1-5, 5-15, 15-30, 30-60, 60-100, 100-110, 110-120, 120-150, 150-200, 200-300, or 300-500% of the channel width; absolute threshold amount, such as 0.1, 0.2, 0.5, 1, 2, 5, 10, 15, 20, 30, 40, 50, 75, 100, 150, 250, 0.1-1, 1-5, 5-15, 15-45, 45-100, or 100-300 GHz; etc.) between each other (e.g., center-to-center distance, edge-to-edge distance, etc.). However, all or some of the channels can alternatively be overlapping (e.g., by no more and/or no less than a threshold amount, such as described above regarding the threshold spacing) and/or have any other suitable relationship to each other. The channels and/or emitters can be indexed based on wavelength (e.g., from shortest to longest wavelength, such as channel 1 being associated with the shortest wavelength, channel 2 being associated with the second shortest wavelength, etc.).

The transducer preferably couples light into one or more structures (e.g., on a chip), such as waveguides. The transducer is preferably an optical transducer, more preferably an electro-optical transducer (e.g., which outputs lights based on an electrical input), but can additionally or alternatively be any other suitable transducer. For example, the input module can include one or more transducers such as described in U.S. Pat. No. 10,009,135, issued 26 Jun. 2018 and titled "System and Method for Photonic Processing", which is hereby incorporated in its entirety by this reference.

In one embodiment, each transducer includes an emitter and an amplitude modulator. The input module can additionally or alternatively include multiple transducers that receive light from a shared emitter, such as wherein the shared emitter emits light (e.g., unmodulated or substantially unmodulated light) corresponding to multiple optical channels (e.g., multiple wavelength channels), such as shown by way of example in FIG. 2D. The emitter is preferably a laser (e.g., diode laser, preferably a component of an integrated circuit), such as a distributed feedback (DFB) laser, a distributed Bragg reflector (DBR) laser, a Fabry Perot (FP) cavity laser (e.g., with multiple modes, thereby outputting light of multiple wavelengths) such as a quantum dot- and/or quantum well-based FP cavity laser, an external cavity laser (e.g., optionally including one or more integrated modulators), a mode-locked laser (e.g., gain-absorber system) configured to output light of multiple wavelengths, an optical frequency comb (OFC), and/or a vertical cavity surface emitting laser, but can additionally or alternatively include an LED and/or any other suitable light emitter. In some examples, the emitter (e.g., DFB laser emitting a single wavelength, DBR laser emitting multiple wavelengths, etc.) can be coupled to (output light to) one or more modulators (e.g., Mach-Zehnder modulators), wherein the modulators are driven by one or more varying (e.g., oscillating) signals, thereby generating additional optical channels. In some examples, the emitter (e.g., DFB laser emitting a single wavelength, DBR laser emitting multiple wavelengths, etc.) can be coupled to (output light to) one or more nonlinear optical elements (e.g., silicon nitride ring exhibiting nonlinear optical effects). The transducer preferably includes one amplitude modulator for each emitter and/or each channel. The amplitude modulator is preferably an optical modulator, but can additionally or alternatively be an emitter modulator or any other suitable modulator.

Figure 5A:
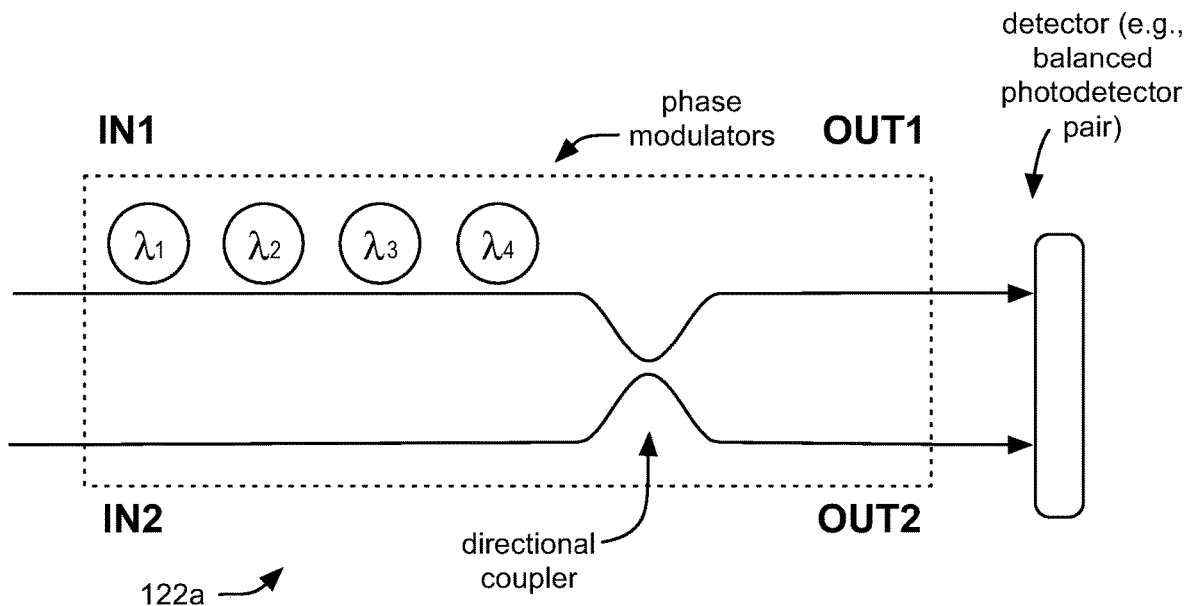
FIGS. 5A-5B are schematic representations of a first and second embodiment, respectively, of a phase weight bank.
Figure 5B:
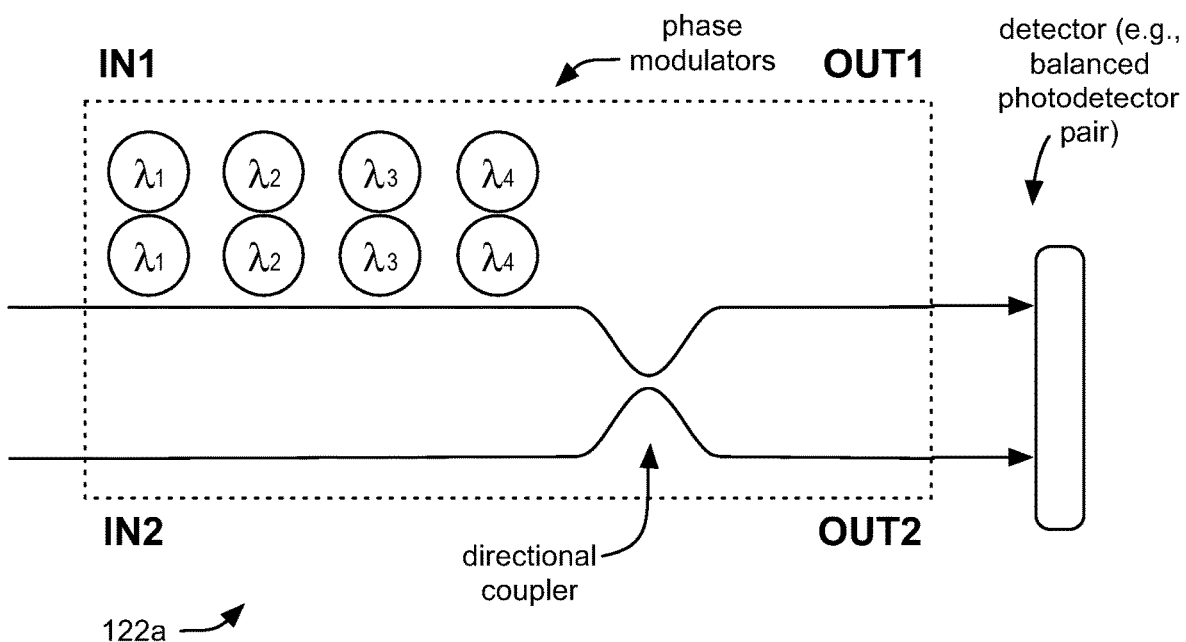

The optical modulator preferably functions to modulate light emitted by an emitter (or multiple emitters). The optical modulator is preferably wavelength-selective (e.g., substantially modulating only a narrow wavelength band, such as substantially modulating only light of a single channel), but can alternatively be a wideband modulator and/or have any other suitable wavelength dependence. The optical modulator can be electro-absorptive and/or electro-refractive. The optical modulator can optionally be embedded in one or more other structures, such as a resonator and/or Mach-Zehnder interferometer (MZI), which can function to enhance its modulation performance. In examples, the optical modulator can include one or more microresonators (e.g., microring resonator, microdisk resonator, photonic crystal defect state modulator), quantum confined Stark effect (QCSE) modulator, Zeno effect modulator (e.g., graphene based modulator, such as a silicon photonic graphene modulator), MZI modulator, electro-absorptive modulator embedded in a critically coupled resonator (e.g., QCSE microdisk modulator), photonic crystal-based modulator, and/or any other suitable optical modulator. The optical modulator (e.g., wideband modulator) can optionally be embedded in and/or in series (along the optical path) with one or more filters (e.g., spectral filters), such as an electro-absorptive modulator preceded (along the optical path) by a first filter and followed by a second filter. In some variations, the optical modulator includes multiple microresonators (e.g., as described in U.S. patent application Ser. No. 16/374,991, filed 4 Apr. 2019 and titled "Photonic Filter Bank System and Method of Use", which is hereby incorporated in its entirety by this reference; as shown in FIGS. 5B and/or 5D; etc.). The optical modulators can additionally or alternatively include mode modulators (e.g., as described in Lian-Wee Luo, Noam Ophir, Christine P. Chen, Lucas H. Gabrielli, Carl B. Poitras, Keren Bergmen, and Michal Lipson, "WDM-compatible mode-division multiplexing on a silicon chip," Nat. commun. 5, 3069 (2014), which is hereby incorporated in its entirety by this reference). In some variations, the optical modulator includes multiple filters and/or modulators coupled together using inverse design (e.g., as described in Weiliang Jin, Sean Molesky, Zin Lin, Kai-Mei C. Fu, and Alejandro W. Rodriguez, "Inverse design of compact multimode cavity couplers," Opt. Express 26, 26713-26721 (2018), which is hereby incorporated in its entirety by this reference). However, the system can additionally or alternatively include any other suitable optical modulators, or include no such modulators.

The emitter modulator can function to control light emission from the emitter (or from multiple emitters). For example, the emitter modulator can provide an electrical signal that drives the associated emitter, or there can be no emitter modulator, wherein the input signal (e.g., electrical signal, such as from the control module) directly drives the emitter. In a specific example, in which the transducer is a laser device, the modulated laser gain medium can be an active optical semiconductor, which can act as a subthreshold temporal integrator with time-constant equal to carrier recombination lifetime. The laser device itself can act as a threshold detector, rapidly dumping energy stored in the gain medium into the optical mode when the net gain of the cavity crosses unity (e.g., similar to a passively Q-switched laser biased below threshold). However, the input modulator (e.g., amplitude modulator) can additionally or alternatively include any other suitable emitter modulator(s), and/or any other suitable modulators of any kind(s).

The transducers can additionally or alternatively include any other suitable elements. The transducers of the input module can be substantially the same as each other (e.g., aside from emitting at and/or modulating different wavelengths), or can be different from one another.

1.1.2 Multiplexer

The multiplexer preferably functions to combine multiple optical signals (e.g., channels) onto a single output path (e.g., a waveguide), such as for wavelength-division multiplexing (WDM). The multiplexer is preferably an optical multiplexer, such as an arrayed waveguide grating (AWG), but can additionally or alternatively be any other suitable multiplexer.

Figure 2A:
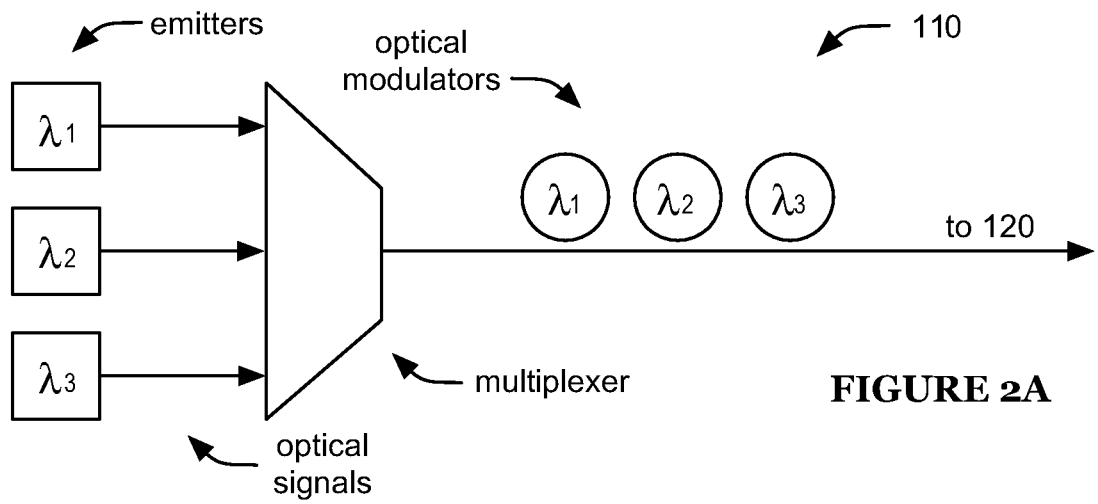
FIGS. 2A-2C are schematic representations of a first, second, and third embodiment, respectively, of the input module.

In a first embodiment of the input module, signals (e.g., unmodulated signals) from multiple emitters are combined by a multiplexer, then modulators (preferably wavelength-selective modulators, such as microresonators) alter the multiplexed signals (e.g., as shown in FIG. 2A). Preferably, each wavelength-selective modulator alters a single signal, wherein the other signals (e.g., wavelengths) pass through and/or by the modulator substantially unaltered. Additionally or alternatively, some or all of the modulators can substantially affect more than one of the signals.

Figure 2B:
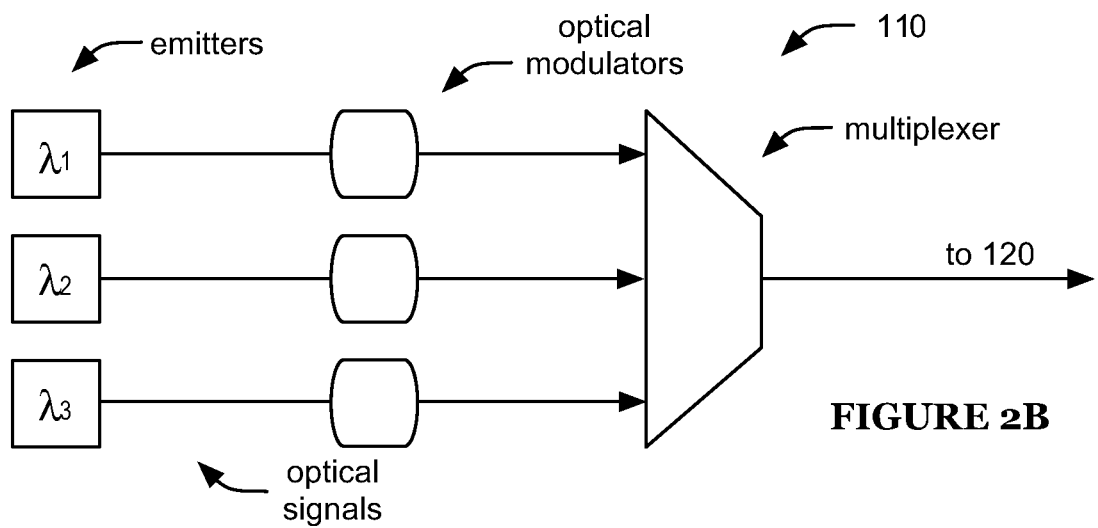
Figure 2C:
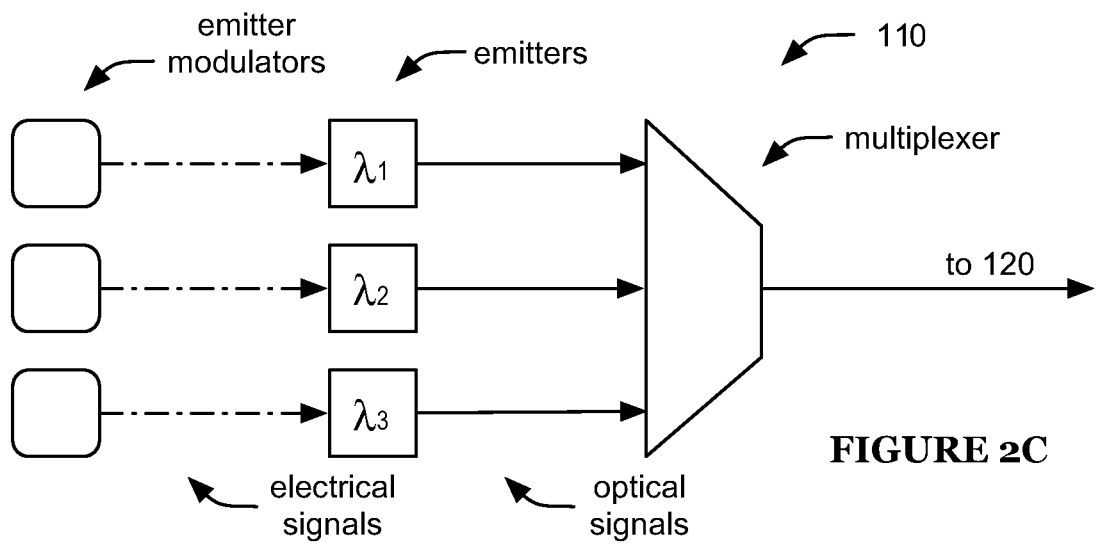

In a second embodiment, modulated signals from multiple transducers (e.g., optical transducers, preferably electro-optical transducers) are combined by a multiplexer. In a first example of this embodiment, an optical modulator is arranged between each emitter and the multiplexer (e.g., as shown in FIG. 2B). In a second example, an emitter modulator controls each emitter (e.g., as shown in FIG. 2C).

The input module is preferably controlled by the control module (e.g., by electrical signals from the control module). The input module preferably outputs to the computation module (e.g., the WDM optical signal is sent to an input of the computation module, preferably along a waveguide). However, the input module can additionally or alternatively interface with other elements of the system in any other suitable manner, and/or the input module can additionally or alternatively include any other suitable elements in any suitable arrangement.

1.2 Computation Module

Figure 3A:
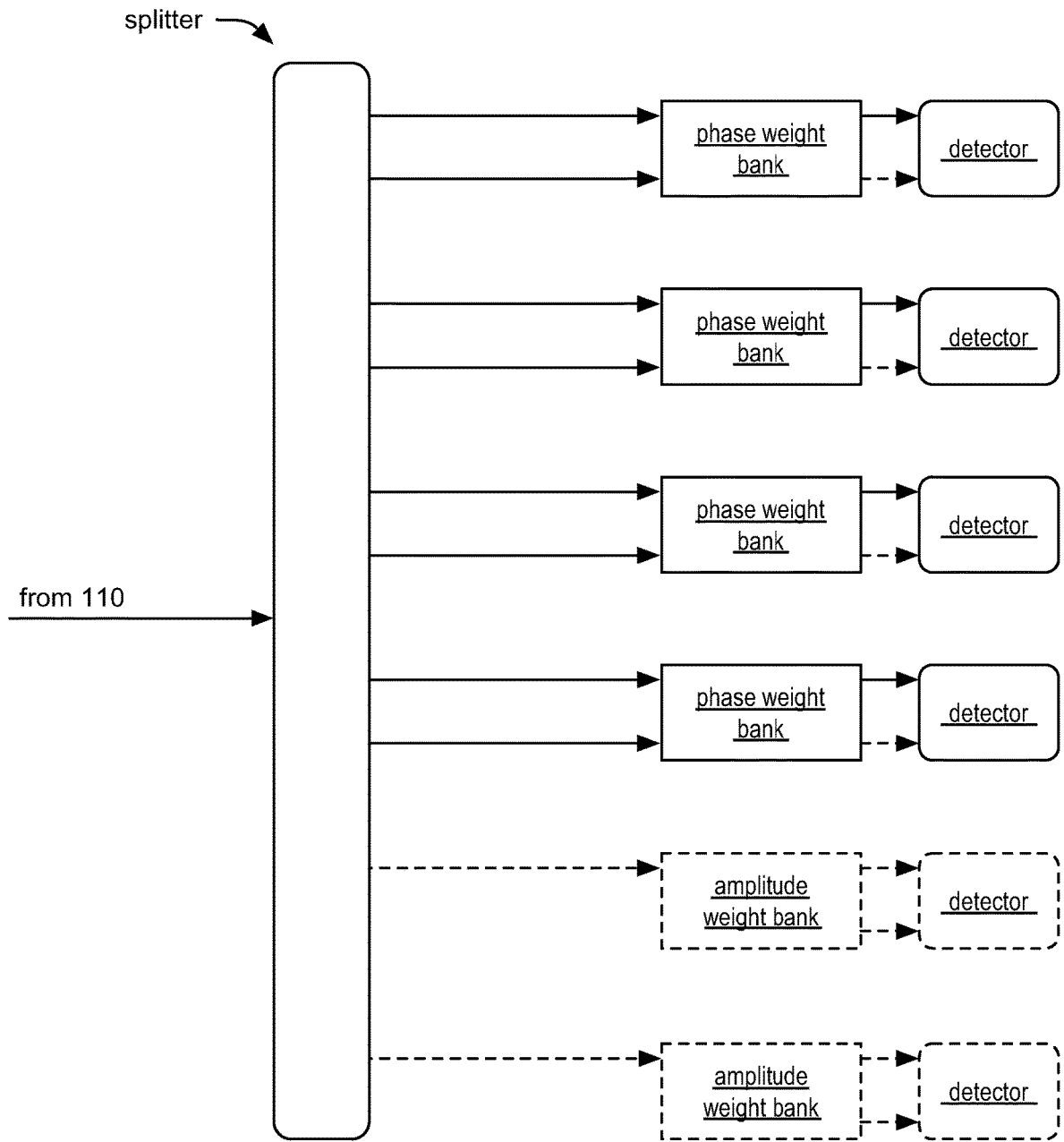
FIGS. 3A-3B are schematic representations of an embodiment of the computation module and an example of the embodiment, respectively.
Figure 3B:
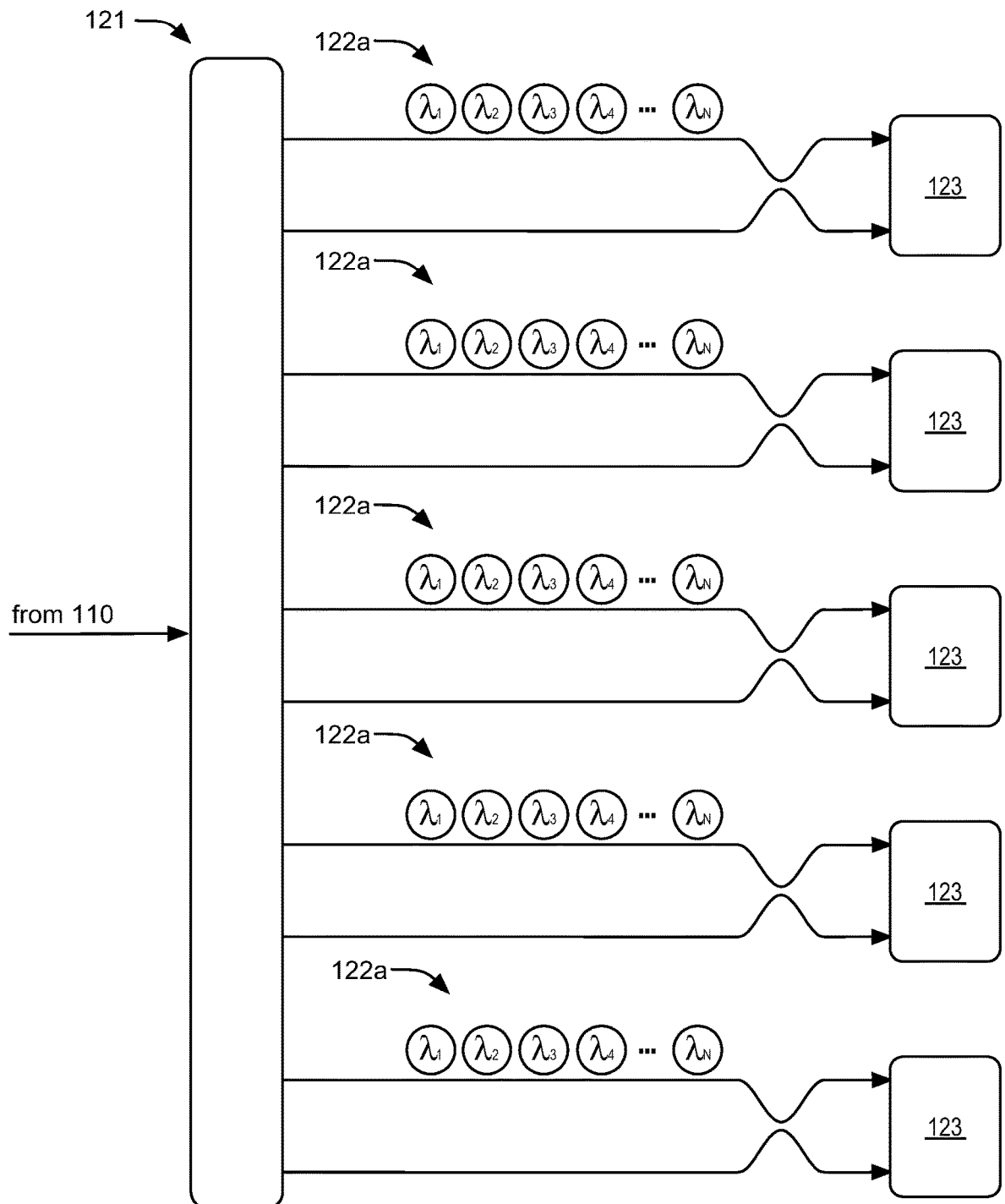
Figure 7A:
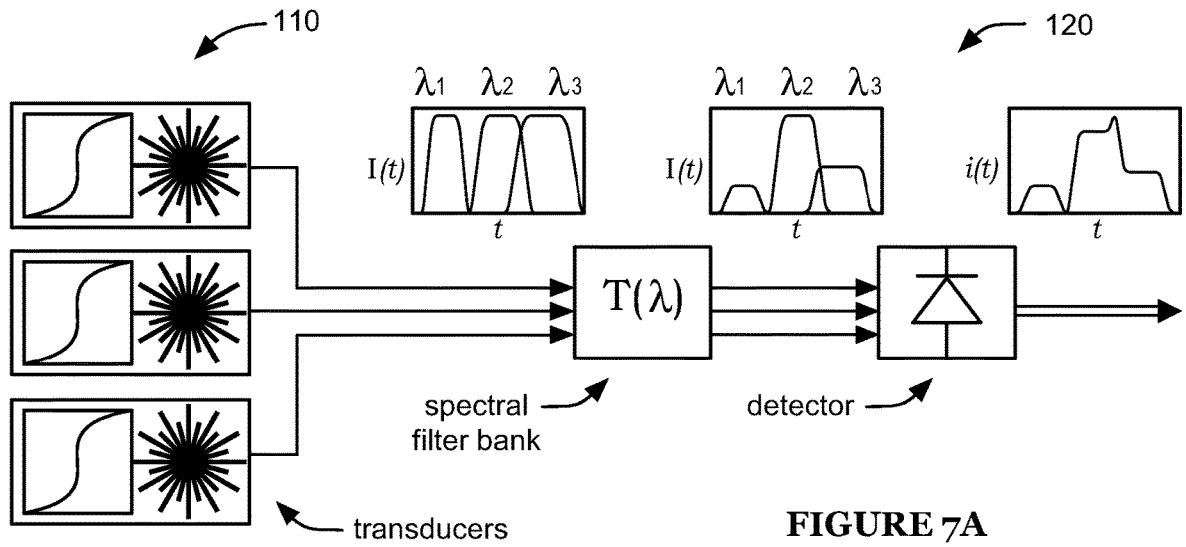
FIGS. 7A-7B are schematic representations of a first and second example, respectively, of photonic elements of the system.

The computation module 120 preferably functions to perform photonic computations (e.g., matrix multiplication) based on signals from the input and/or control modules. For example, the computation module can multiply an input vector (e.g., encoded by the WDM signal received from the input module) by a matrix (e.g., associated with the input signals from the control module) to determine an output vector (e.g., associated with output signals generated by the computation module). The computation module preferably includes one or more spectral filter banks 122 and detectors 123, and can optionally include one or more splitters 121 (e.g., as shown in FIGS. 3A, 3B, 7A, and/or 7B). However, the computation module can additionally or alternatively include any other suitable elements.

1.2.1 Spectral Filter Banks

Figure 4A:
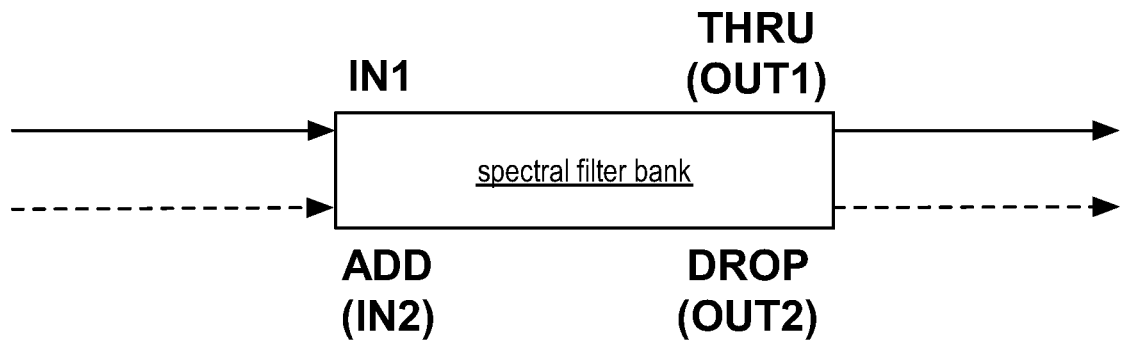
FIGS. 4A-4C are schematic representations of a first, second, and third variation, respectively, of a spectral filter bank.
Figure 4B:
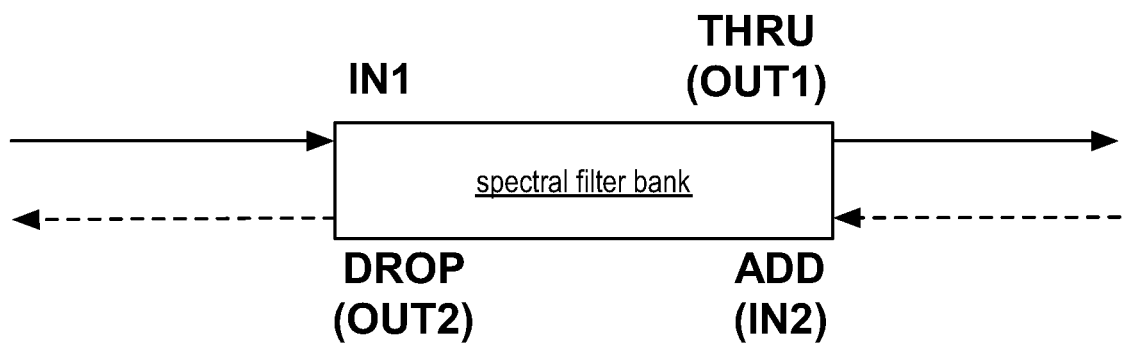
Figure 4C:
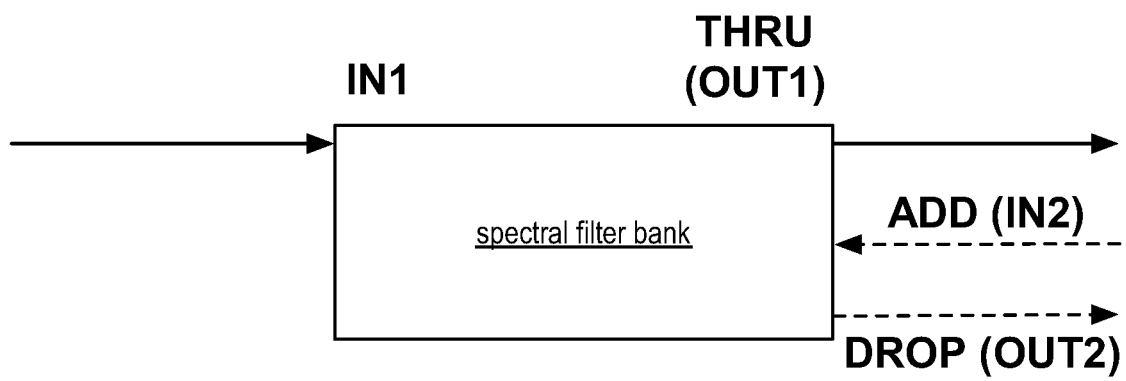

Each spectral filter 122 bank preferably functions to filter (e.g., filter in a substantially time-independent manner; switch, such as at a low rate; modulate at a high rate, such as comparable to the bandwidth of the input optical signal; otherwise control; etc.) an optical signal based on a control signal, wherein such filtering can include altering the amplitude (e.g., diminishing and/or amplifying), phase (e.g., delaying and/or reducing delay), and/or any other suitable optical characteristics. Each spectral filter bank preferably includes a set of filter elements, more preferably wherein each filter element is associated with (e.g., filters) a channel (or set of channels) of the input signal. The computation module preferably includes a plurality of spectral filter banks (e.g., each corresponding to a row of the matrix). Each spectral filter bank preferably receives (e.g., at an IN port of the spectral filter bank) an optical signal input (e.g., WDM signal) and a set of control signals. The optical signal input is preferably received from the splitter (e.g., along one or more of the paths onto which the signal is split), but can additionally or alternatively be received from any other suitable element. The control signals (e.g., filter weights) are preferably received from the control module, but can additionally or alternatively be received from any other suitable element. The control signals are preferably electrical signals (e.g., voltage signals). The control signals preferably control operation of one or more filter elements of the spectral filter bank. The control signals preferably include one weight for each filter element, but can additionally or alternatively include any other suitable number of weights. In some embodiments, the number of filters and number of weights can be equal to the number of channels in the optical signal input (e.g., equal to the number of emitters in the input module). Each weight and filter can correspond to an element of the matrix row associated with the spectral filter bank (or to an integer number of such elements, such as 2, 4, 8, 16, 32, 2-8, 9-32, etc.). The spectral filter bank preferably outputs the filtered optical signal(s) (e.g., to one or more detectors). In some examples, the spectral filter bank has multiple optical outputs (e.g., THRU port and DROP port, OUT1 port and OUT2 port, etc.), one or more of which outputs to a detector (e.g., as shown in FIGS. 4A-4C). The spectral filter bank(s) can optionally include weight banks (and/or elements thereof) such as described in U.S. Pat. No. 10,009,135, issued 26 Jun. 2018 and titled "System and Method for Photonic Processing", which is hereby incorporated in its entirety by this reference (e.g., as described regarding the MRR weight bank, such as employing microring resonators, microdisk resonators, photonic crystal-based resonators, any modulators described above regarding the input modulators, and/or any other suitable filters, etc.), such as shown by way of example in FIG. 5C. A person of skill in the art will recognize that each filter element can include a single filtering device, multiple filtering devices (e.g., arranged in series and/or parallel), multiple tunable elements, and/or any other suitable elements capable of filtering a channel (or set of channels) of the input signal.

The filter elements (e.g., of the spectral filter banks) preferably function to filter the optical input signal. In a first embodiment of the spectral filter bank, every channel propagates past all the filter elements of the spectral filter bank (e.g., as shown in FIGS. 5A-5D). In this embodiment, the filter elements are preferably wavelength-selective optical filters (e.g., substantially filtering only a narrow wavelength band, such as substantially filtering only light of a single channel). The wavelength-selective optical filters are preferably microresonators (e.g., more preferably microdisc resonators, but additionally or alternatively including microring resonators, photonic crystal defect state filters, etc.).

In some embodiments, each microresonator includes a plurality of p-n junctions (preferably, a large number of p-n junctions, such as at least 8, 16, 32, 64, 128, 256, 512, or 1024 junctions, etc.), which can enable the microresonator to accept one or more digital control signals (e.g., rather than analog control signals). In a first example, the microresonator accepts a unary control signal (e.g., thermometer code), such as described by way of example in Moazeni, Sajjad, Sen Lin, Mark Wade, Luca Alloatti, Rajeev J. Ram, Miloš Popović, and Vladimir Stojanović, "A 40-Gb/s PAM-4 transmitter based on a ring-resonator optical DAC in 45-nm SOI CMOS", *IEEE Journal of Solid-State Circuits* 52, no. 12 (2017): 3503-3516, which is herein incorporated in its entirety by this reference. In a second example, the microresonator accepts a binary control signal, preferably wherein each bit of the binary control signal is configured to control a different number of p-n junctions, depending on the bit's significance (e.g., wherein the least significant bit drives 1 junction, the next bit drives 2 junctions, the next bit drives 4 junctions, the next bit drives 8 junctions, and so on, preferably with the most significant bit driving approximately half of the total number of junctions). However, the microresonator can additionally or alternatively accept any other suitable control signals and/or other electrical inputs. The microresonators (e.g., microdiscs, microrings, etc.) can have any suitable doping geometry (e.g., with the plurality of p-n junctions in any suitable arrangement), such as, for example, interleaved, interior ridge, and/or zig-zag doping geometries.

Figure 11A:
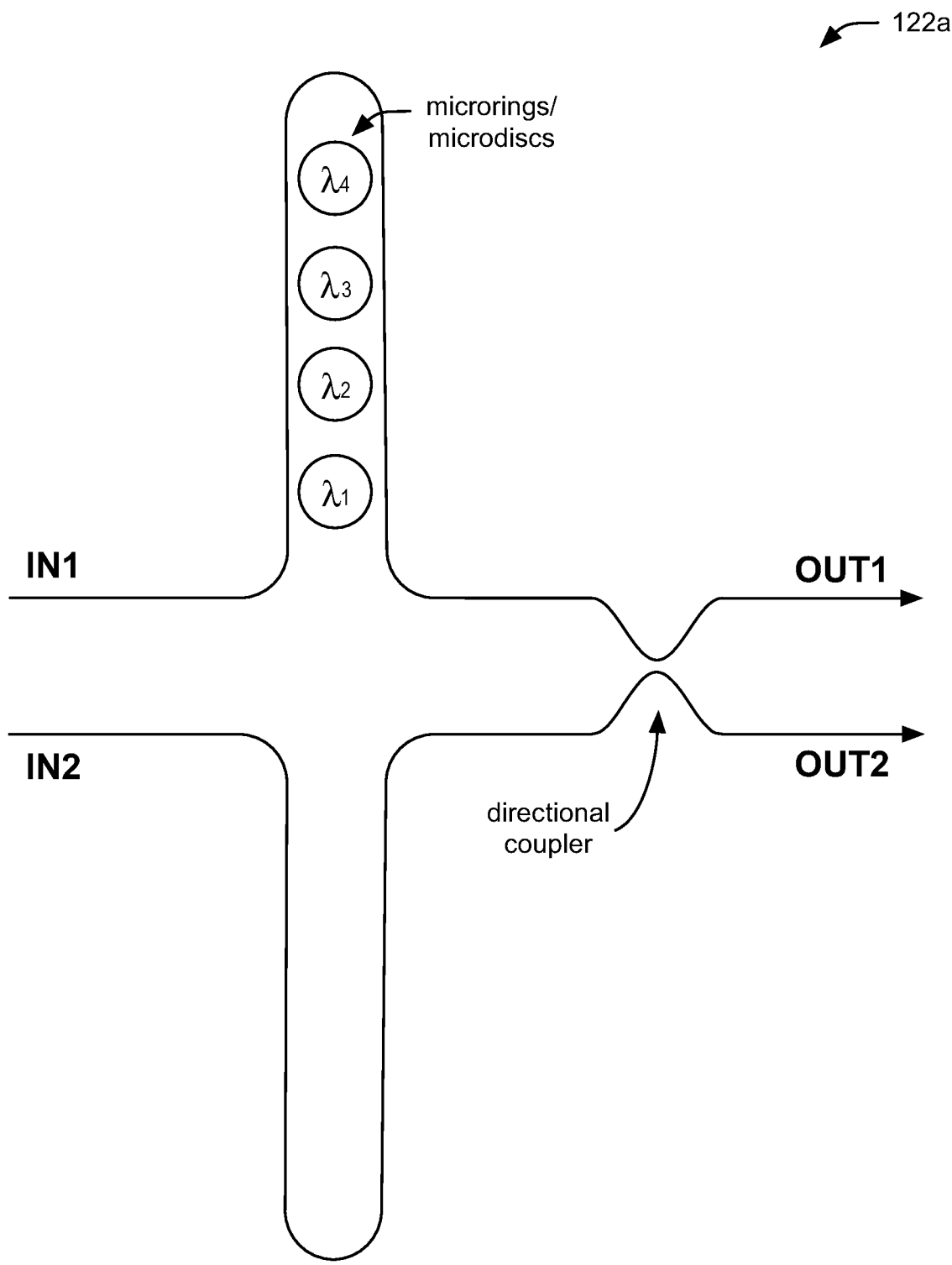
FIGS. 11A-11B are schematic representations of a first and second example, respectively, of a phase weight bank with nested modulator elements.
Figure 11B:
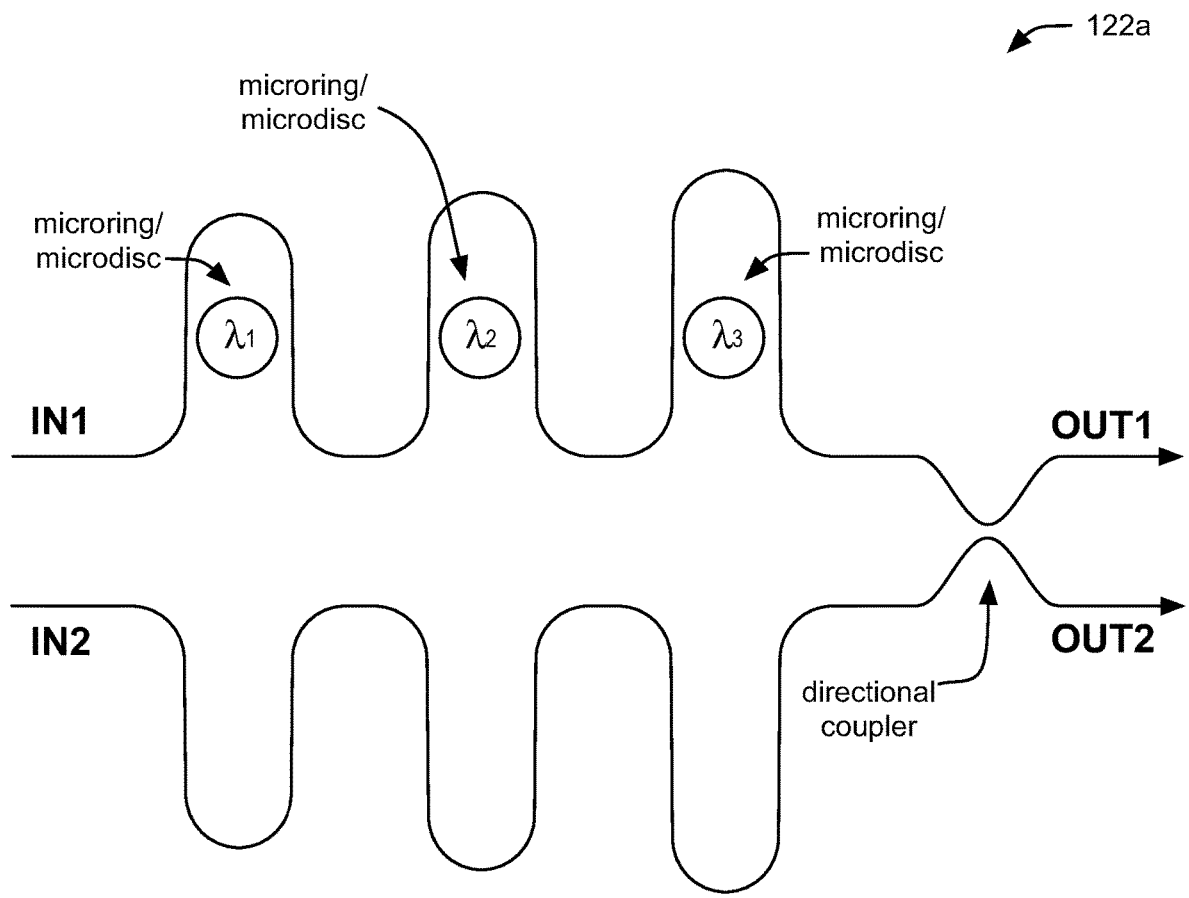
Figure 12A:
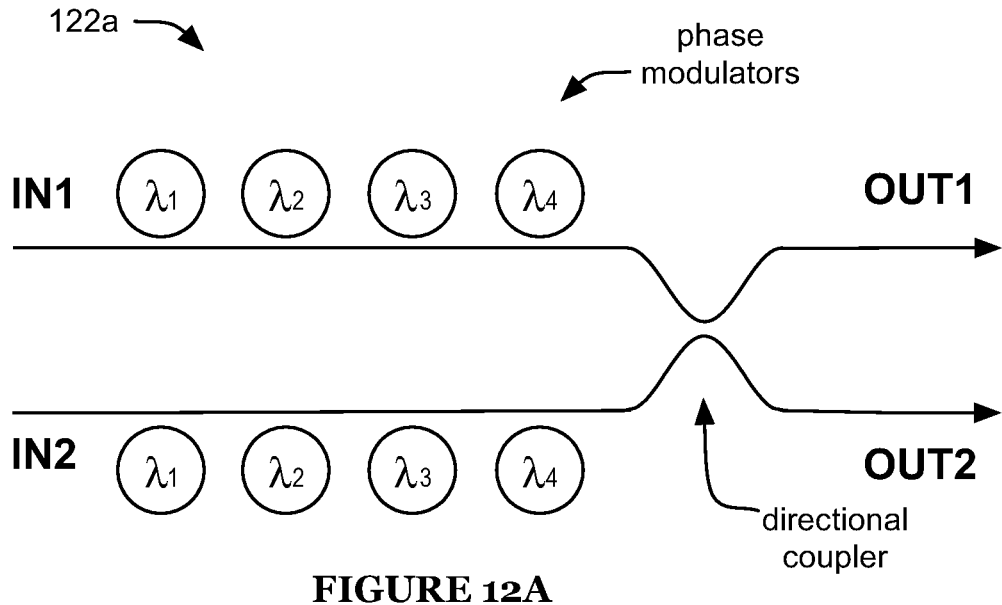
FIGS. 12A-12D are schematic representations of various examples of a double-modulator assisted phase weight bank.
Figure 12B:
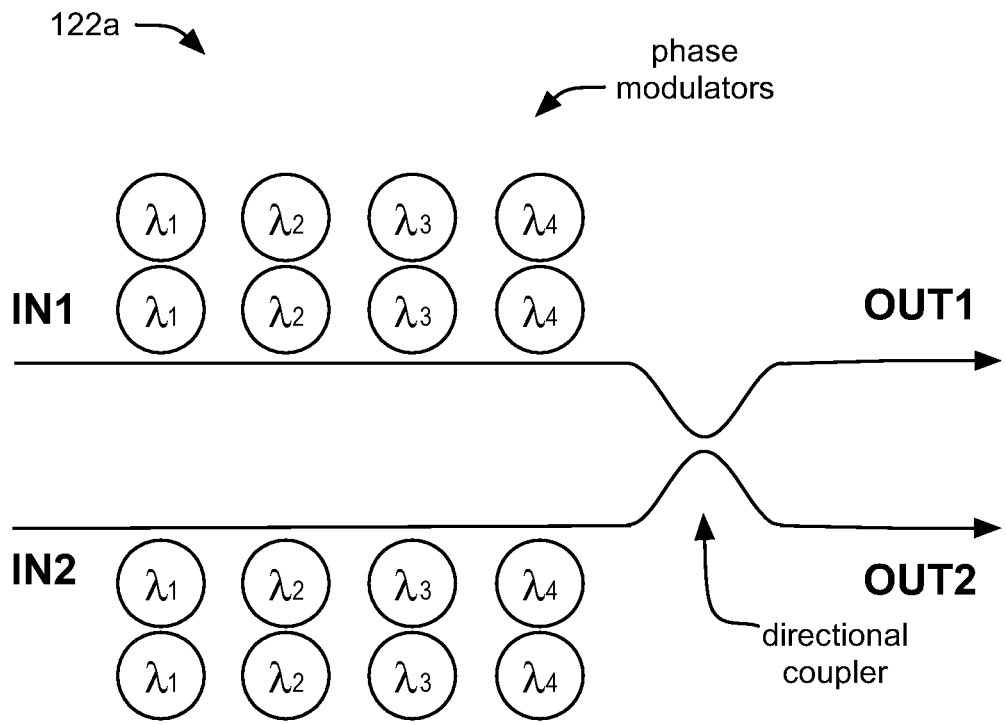
Figure 12C:
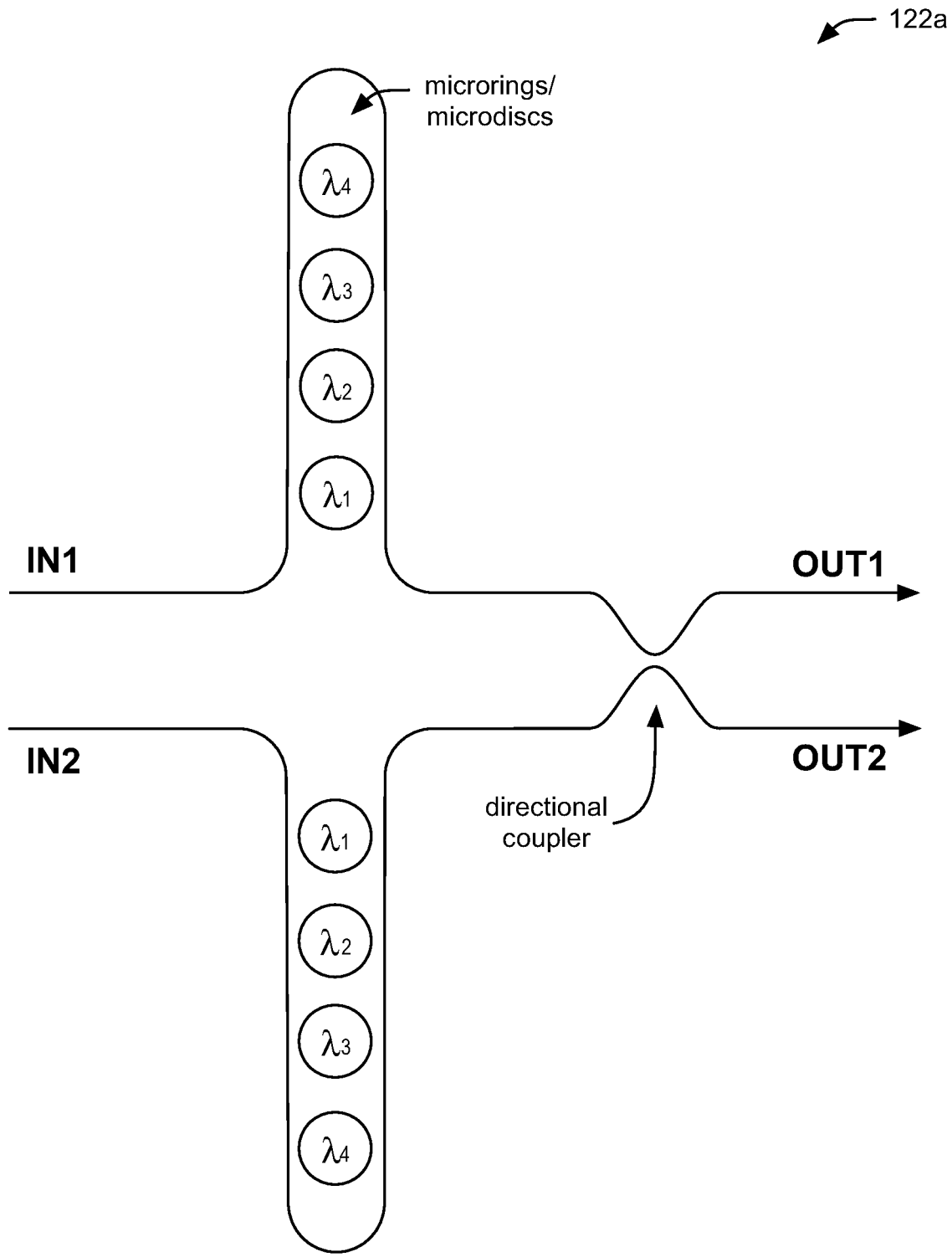
Figure 12D:
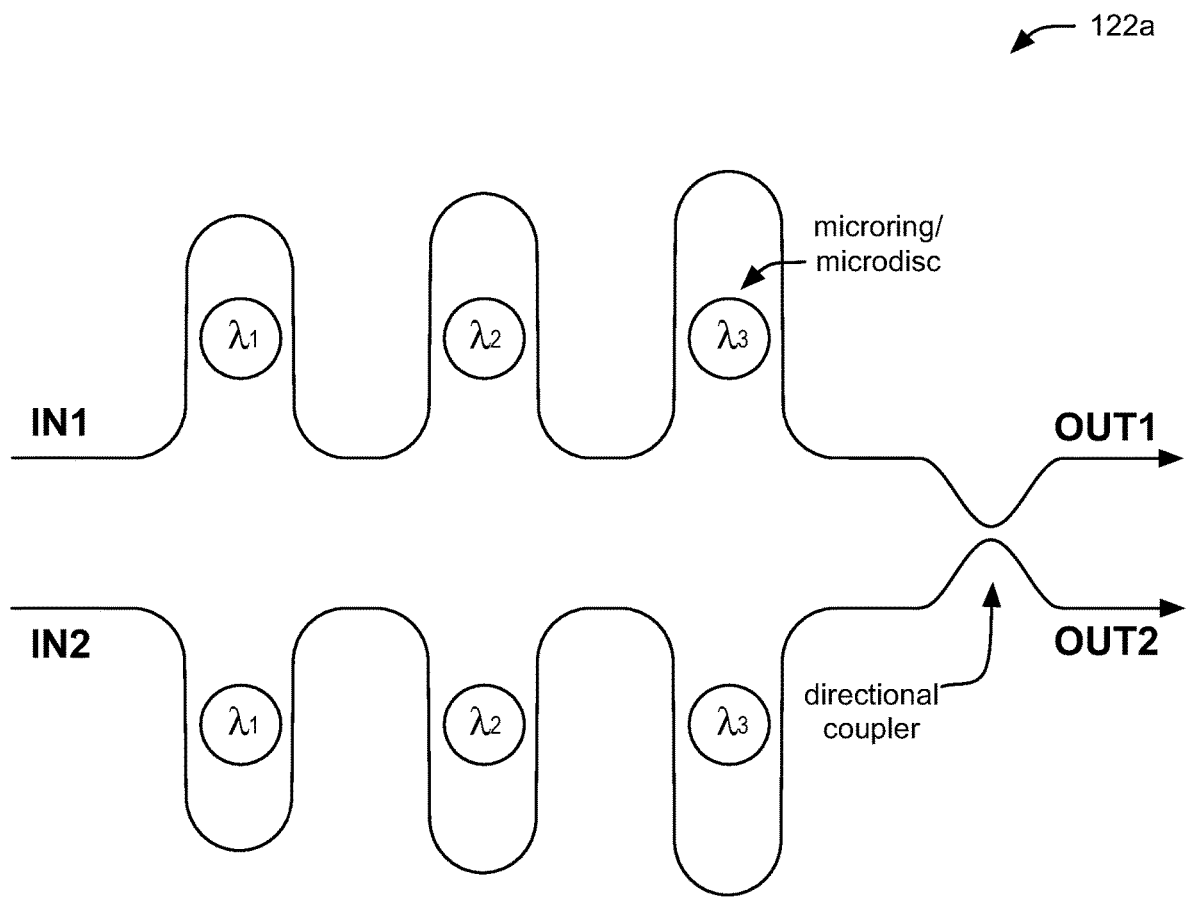

The optical filter can optionally be embedded in one or more other structures, such as a resonator and/or Mach-Zehnder interferometer (MZI), which can function to enhance its modulation performance and/or alter the modulation mechanism. In some variations, the optical filter includes multiple microresonators (e.g., as described in Alexander N. Tait, Allie X. Wu, Thomas Ferreira de Lima, Mitchell A. Nahmias, Bhavin J. Shastri, and Paul R. Prucnal, "Two-pole microring weight banks," Opt. Lett. 43, 2276-2279 (2018), which is hereby incorporated in its entirety by this reference; as shown by way of example in FIG. 5B). In some variations, the optical filter includes multiple filters and/or modulators coupled together using inverse design (e.g., as described in Weiliang Jin, Sean Molesky, Zin Lin, Kai-Mei C. Fu, and Alejandro W. Rodriguez, "Inverse design of compact multimode cavity couplers," Opt. Express 26, 26713-26721 (2018), which is hereby incorporated in its entirety by this reference). In some variations, the optical filter includes one or more nested modulator elements, such as modulator elements including one or more microresonators (e.g., microrings, microdiscs, etc.) coupled to one or more outer feedback arms (e.g., coupled to the microresonator in an add/drop configuration, such as shown by way of example in FIGS. 11A-11B and/or 12C-12D). For example, the optical filter can include one or more nested modulator elements such as described in "S. Darmawan, Y. M. Landobada, and M. K. Chin, "Nested ring Mach-Zehnder interferometer", Opt. Express 15, 437-448 (2007), which is hereby incorporated in its entirety by this reference.

Figure 10A:
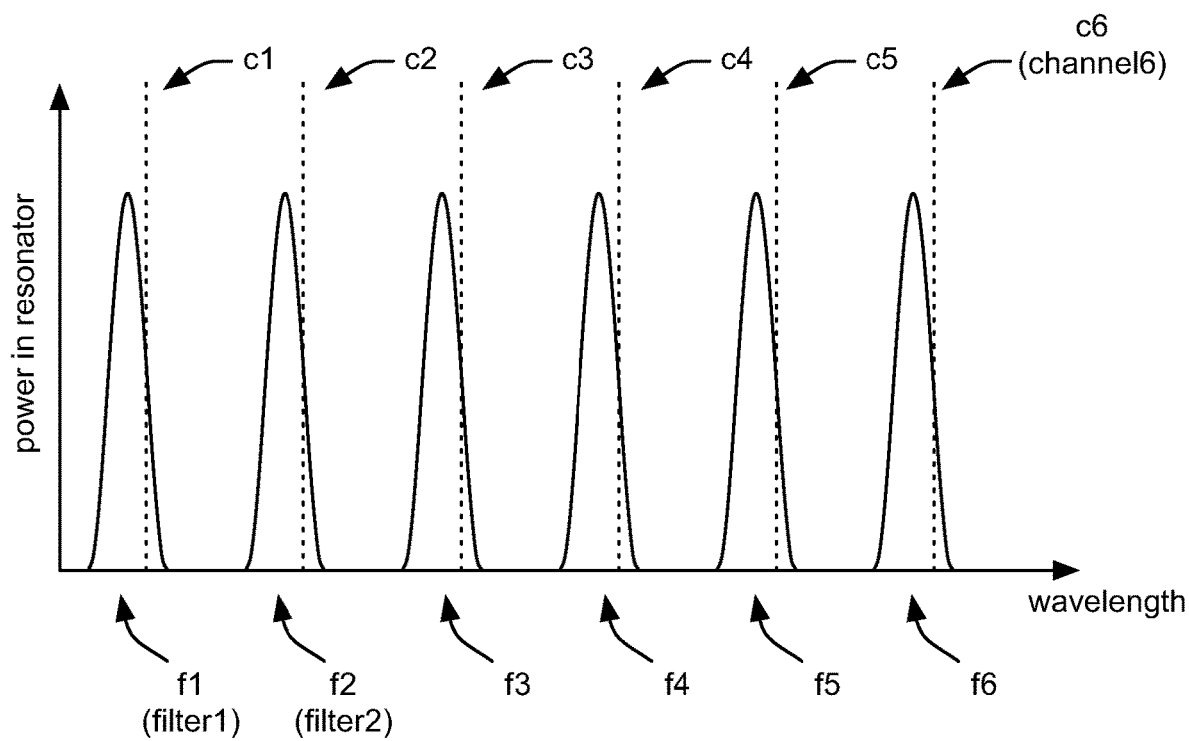
FIGS. 10A-10B are schematic representations of optical channels and filter resonances of a first and second example, respectively, of the system.
Figure 10B:
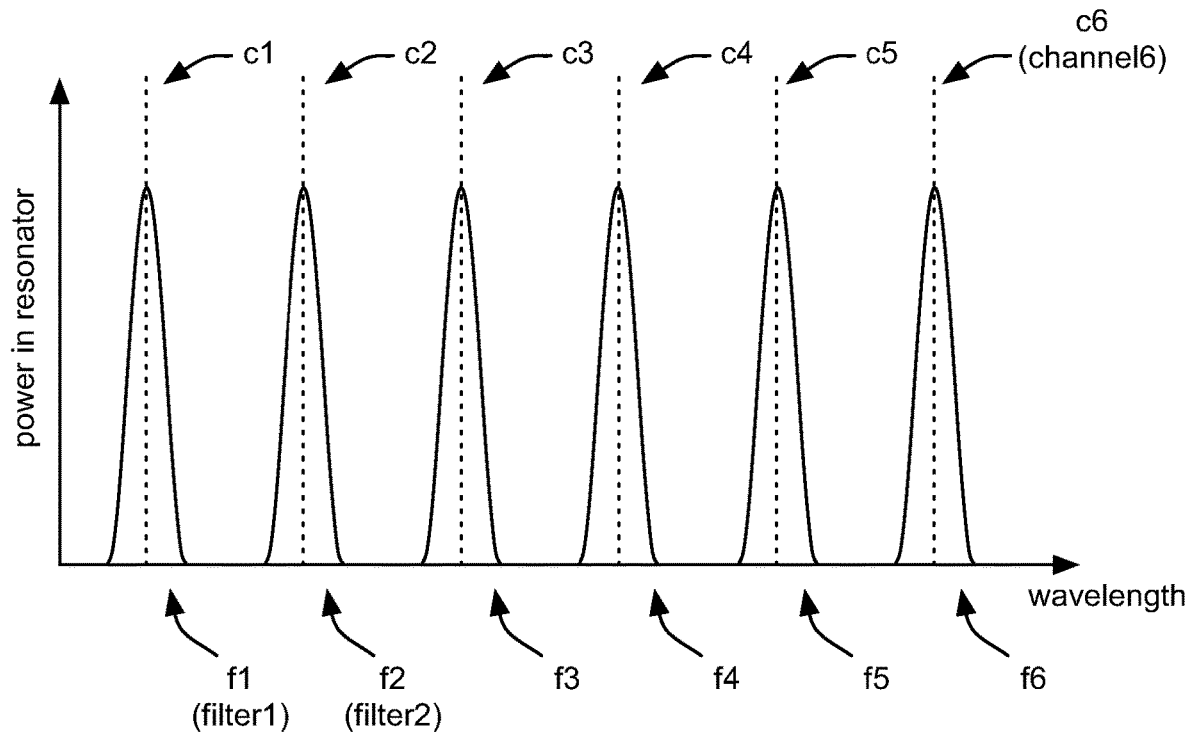

Each filter of a spectral filter bank (e.g., weight bank) preferably has a different resonance wavelength (e.g., resonance wavelength under fixed conditions, such as a typical operating temperature and no applied voltage). Preferably, each resonance wavelength corresponds to (e.g., is within, such as substantially centered within) a different wavelength channel (e.g., as shown in FIGS. 10A-10B).

In a second embodiment, each channel is split onto a different sub-path to interact with a filter element associated with that channel. In a first example of this embodiment, the modulated path includes for each channel: a drop filter to branch a sub-path off the main path, a filter on that sub-path, and an add filter to rejoin the signal from the sub-path to the main path. In this example, the filter is preferably a microresonator (e.g., microring resonator, microdisk resonator, etc.), but can additionally or alternatively include a Bragg filter (e.g., fiber Bragg grating; Bragg reflector, preferably with a mirror and circulator such as a monolithic Bragg reflector with an optical loop mirror and a circulator; etc.) and/or any other suitable filter. In a second example, the modulated path includes a demultiplexer to create a plurality of sub-paths, a filter on each sub-path, and a multiplexer to recombine the sub-paths following modulation. In this embodiment, each filter can be an electro-refractive element, a microresonator, and/or any other suitable filter. However, the spectral filter bank can additionally or alternatively have any other suitable arrangement and/or can define any other suitable optical path(s).

Preferably, each spectral filter bank 122 is a phase weight bank 122*a*. The phase weight bank preferably includes two (or more) paths, a plurality of phase modulator elements, and a coupler (e.g., as shown in FIG. 5A). However, the phase weight bank can additionally or alternatively include any other suitable elements. Each path (e.g., waveguide) preferably receives an input from an output path of the splitter, more preferably receiving identical WDM input signals on each path. In some such embodiments, some or all of the phase weight banks receive the inputs from a respective two-way splitting element of the splitter (e.g., wherein the two-way splitting element receives an input from earlier stage(s) of the splitter, and splits the element into two outputs, one for each path of the phase weight bank). For example, one or more of the phase weight banks can be preceded by a directional coupler (e.g., wherein the directional coupler and phase weight bank cooperatively define an MZI), such as wherein a first portion of the input to the directional coupler, preferably including substantially half of the optical power, is delivered as the first output; and a second portion of the input to the directional coupler, preferably also including substantially half of the optical power, is delivered as the second output (e.g., wherein the second output is substantially identical to the first output, but possibly phase-shifted relative to the first output, such as by $\pi/2$).

Each phase modulator element preferably modulates the phase of a channel (e.g., a wavelength channel) on a path (or both paths) of the phase weight bank, wherein a person of ordinary skill in the art will recognize that modulating the phase of a channel can include one or more of: phase-shifting light of the channel in a substantially time-independent manner; switching phase-shifting of light of the channel, such as at a low rate; modulating phase-shifting of light of the channel at a high rate, such as comparable to the bandwidth of the input optical signal; and/or controlling the phase of light of the channel in any other suitable manner. Preferably, all the modulator elements modulate channels on the same path, but different channels can alternatively be modulated on different paths from each other. The modulator elements are preferably wavelength-specific modulators (e.g., microresonators), but can additionally or alternatively include any other suitable optical phase modulators. In some examples, one or more of the channels can be modulated by a pair of modulator elements (e.g., microresonators such as microrings and/or microdiscs, etc.), the two modulator elements of the pair modulate light on different paths, preferably cooperatively operating as a double-modulator (e.g., double-ring) assisted MZI (e.g., as shown byway of examples in FIGS. 12A-12D). The two modulator elements of the pair can have (and/or be tuned to) different resonances, such as resonance wavelengths on either side of the wavelength channel (target wavelength) they are configured to modulate (e.g., as described in Liangjun Lu, Linjie Zhou, Xinwan Li, and Jianping Chen, "Low-power 2×2 silicon electro-optic switches based on double-ring assisted Mach-Zehnder interferometers", Opt. Lett. 39, 1633-1636 (2014), which is hereby incorporated in its entirety by this reference), preferably wherein the resonance wavelengths are closer (e.g., much closer, such as by a factor of at least 1.5, 2, 3, 5, 10, 20, 50, 1.5-3, 3-10, 10-30, and/or 30-100, etc.; slightly closer, such as by a factor between 1 and 1.5; etc.) to the target wavelength than to wavelengths of any other channel modulated by the filter bank. However, the filter bank can additionally or alternatively include any other suitable modulator elements.

The coupler preferably functions to couple the two paths of the phase weight bank past the phase modulator elements (e.g., to couple light propagating on the two paths after it has been phase-modulated by the phase modulator elements of the phase weight bank). For example, the coupler can be a directional coupler, such as a coupler including coupled waveguide segments. The interference between the signals on the two paths preferably generates an amplitude signal based on the signals' phase differences (e.g., phase differences imposed by the phase modulators). In some examples (e.g., in which a substantially equal signal intensity is provided at each input of the phase weight bank, such as corresponding to an intensity value of 1), if the signals on the two waveguides reach the coupler with substantially no phase difference (e.g., if no phase shift is imposed by the phase filter, the input signals are in phase, and the two waveguides have substantially equal optical path lengths; if a phase shift imposed by the phase filter substantially cancels a phase difference arising from offsets in the input phases and/or differences in the optical path lengths; etc.), the output intensity at each arm can be substantially equal to each other (e.g., resulting in a 0 output value at a balanced photodetector pair), such as having an intensity value of approximately 1 (e.g., ignoring transmission losses); by varying the phase shift, the output intensities can be varied, preferably from a first extremum (e.g., at a $\pi/2$ phase shift) in which substantially all output intensity appears on the waveguide with the phase filter(s) and substantially none appears on the other waveguide, to a second extremum (e.g., at a $-\pi/2$ phase shift) in which substantially no output intensity appears on the waveguide with the phase filter(s) and substantially all appears on the other waveguide.

The computation module can additionally or alternatively include one or more amplitude weight banks and/or any other suitable spectral filter banks. The amplitude weight banks can include weight banks (and/or elements thereof) such as described in U.S. Pat. No. 10,009,135, issued 26 Jun. 2018 and titled "System and Method for Photonic Processing", which is hereby incorporated in its entirety by this reference (e.g., as described regarding the MRR weight bank; similar to the MRR weight bank but with modulators other than microrings, such as any modulators described above regarding the input module amplitude modulators; etc.), such as shown by way of example in FIG. 5C.

However, the system can additionally or alternatively include any other suitable optical filters. Although referred to herein as optical filters, a person of skill in the art will recognize that the filters can additionally or alternatively include optical switches, optical modulators, and/or any other suitable elements.

1.2.2 Detectors

Figure 5C:
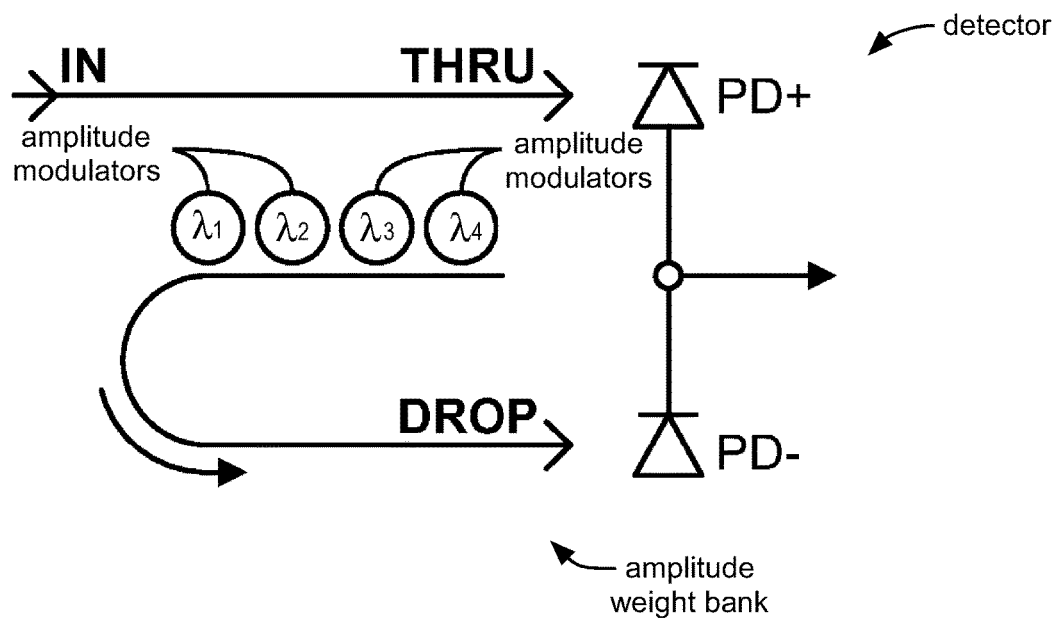
FIGS. 5C-5D are schematic representations of a first and second embodiment, respectively, of an amplitude weight bank.
Figure 5D:
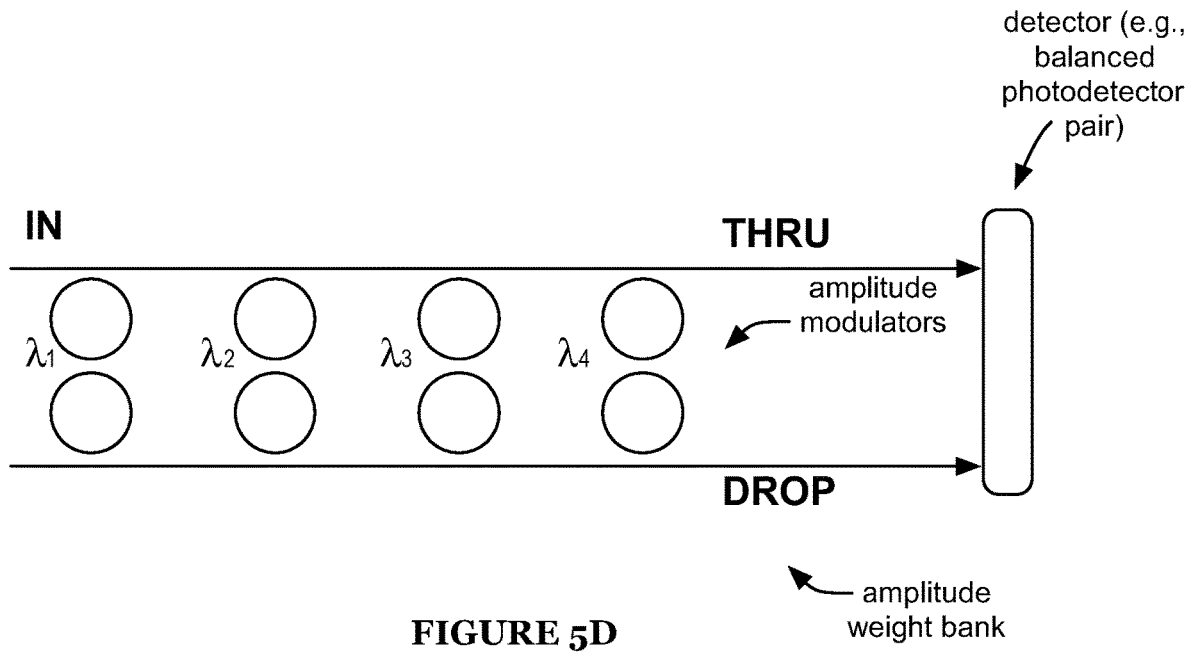

Each detector 123 preferably functions to transduce an optical signal (e.g., into an electrical signal). The computation module preferably includes one detector (e.g., summation detector) associated with each spectral filter bank. However, the computation module can alternatively combine signals from multiple spectral filter banks, wherein the combined signal is input to a single detector. The detectors preferably include one or more photodetectors (e.g., photodiodes), but can additionally or alternatively include any other suitable detectors. In a first embodiment, each detector includes a pair of photodiodes (e.g., balanced photodetector), such as one each on the THRU and DROP ports of the spectral filter bank (e.g., as shown in FIG. 5C). In a second example, the detector is a single photodiode (e.g., on either the THRU or the DROP port). However, the detector can additionally or alternatively include any other suitable arrangement of photodiodes and/or other detectors. Each detector output and/or derivatives thereof, such as combinations of detector outputs (e.g., sums or differences of multiple detector outputs) is preferably delivered to the control module (e.g., as an electrical signal). However, one or more detector outputs can additionally or alternatively be used to drive one or more transducers (e.g., transducers of the same input module, of another input module, etc.). For example, the detector outputs can be used to drive transducers such as described in U.S. Pat. No. 10,009,135, issued 26 Jun. 2018 and titled "System and Method for Photonic Processing", which is hereby incorporated in its entirety by this reference (e.g., as described regarding FIG. 2 of U.S. Pat. No. 10,009,135).

1.2.3 Splitter

The splitter preferably functions to split a signal (e.g., received from the input module), propagating the split signal along a plurality of paths (e.g., waveguides). The number of paths onto which the signal is split is preferably based on the number of spectral filter banks in the computation module (e.g., one path for each weight bank, two paths for each weight bank, three paths for each weight bank, etc.). For example, the signal can be split onto two paths for each phase weight bank and one path for each amplitude weight bank.

The splitting is preferably wavelength-independent; alternatively, different wavelength selective elements can be used to split each channel (or set of multiple channels, such as adjacent channels) independently. The signal is preferably split equally (or substantially equally) between all paths and/or spectral filter banks, but can alternatively be split with any other suitable intensity distribution. The splitter can include one or more splitter elements, such as two-way splitters, star couplers, multimode interference (MMI) couplers, inverse design couplers, and/or any other suitable elements. In one example, the splitter is a tree splitter, including a plurality of splitter elements in a tree configuration (e.g., including a plurality of two-way splitters arranged in a binary tree). In some variations, the tree splitter can include elements of one or more of the above types. For example, a plurality of 1×k couplers (i.e., couplers that split a single input into k paths) can be combined in serial layers to provide N outputs.

In a first embodiment, the signal from the input module is split directly and propagated to all of the spectral filter banks (e.g., as shown in FIG. 3B).

Figure 6A:
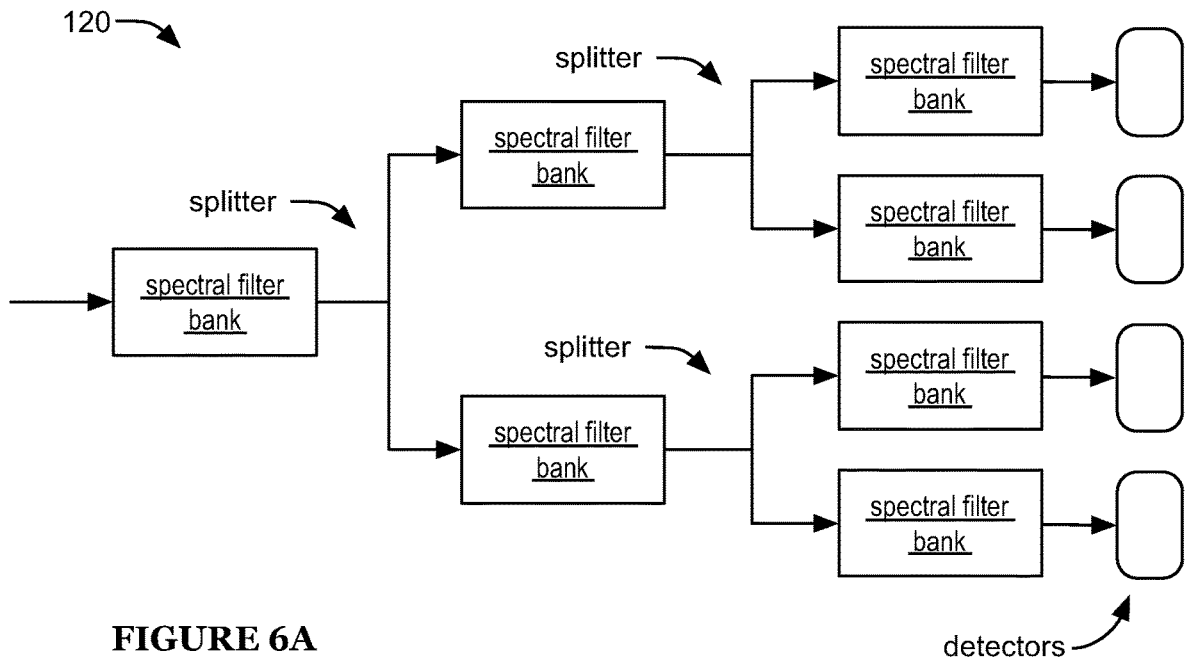
FIGS. 6A-6B are schematic representations of a first alternate embodiment of a portion of the computation module and an example of the first alternate embodiment, respectively.
Figure 6B:
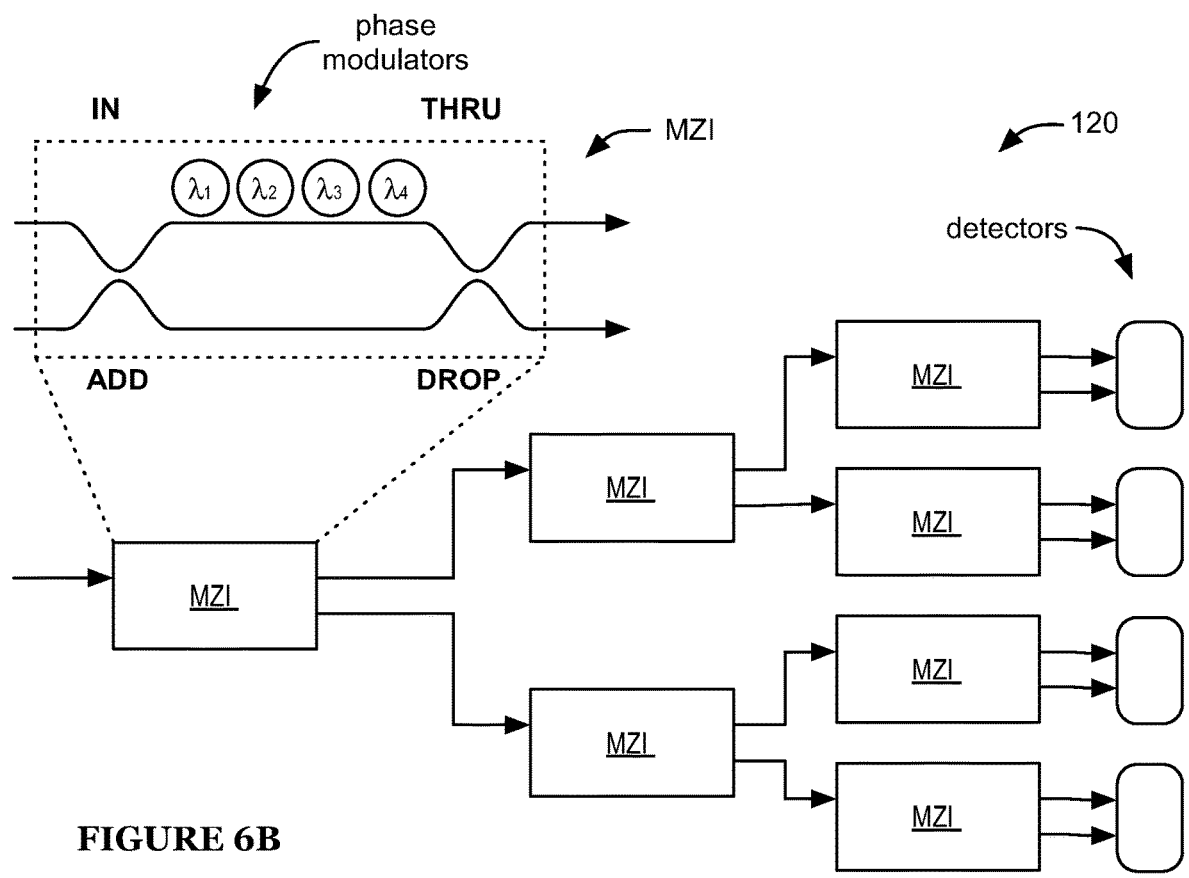

In a second embodiment, splitters are interspersed with (and/or integrated with) spectral filter banks. In this embodiment, the splitter elements and filter banks can be arranged in a tree structure (e.g., binary tree structure, such as shown in FIG. 6A; tree of star couplers, such as described above; etc.). In a specific example, the spectral filter banks are integrated with a set of MZIs (e.g., a spectral filter bank on one path of each MZI), wherein the THRU port of any given MZI is fed to the IN port of a first downstream MZI and the DROP port of the given MZI is fed to the IN port of a second downstream MZI (e.g., as shown in FIG. 6B).

However, the system can additionally or alternatively include any other suitable splitter(s) in any suitable arrangement, or can include no splitter (e.g., wherein the computation module includes a single spectral filter bank and detector which filter the optical input signal).

1.2.4 Alternate Embodiments

In alternate embodiments, the computation module is configured to perform matrix operations (e.g., matrix multiplication, such as vector-matrix multiplication) for matrices of sizes greater than the number of optical channels (e.g., the number of transducers). For example, such embodiments can including expanding the input signal to K multiple optical streams (e.g., in the form of multiple input waveguides), each with L channels (e.g., wavelengths), for a total input vector of length K·L, while still allowing full generality to an implementation of any real matrix using linear optical components. For example, such an embodiment could implement a 64×64 matrix operation by using 8 waveguides and 8 wavelengths per waveguide. In these embodiments, the input module 110 can optionally include multiple waveguides (e.g., K waveguides), preferably including substantially identical WDM signals, and/or the computation module 120 can include a splitter that couples the optical signal from the input module into multiple waveguides.

Figure 8A:
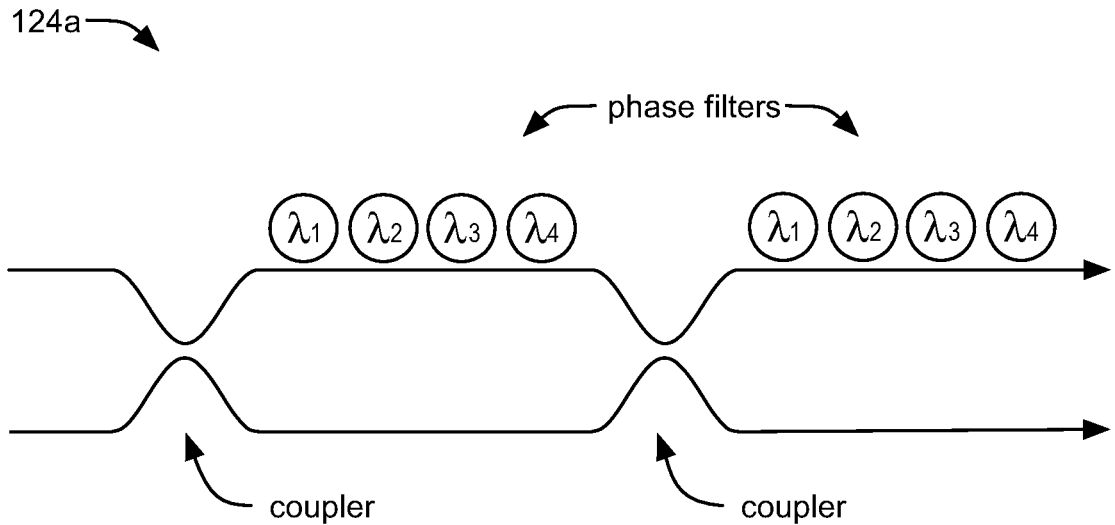
FIGS. 8A-8B are schematic representations of a first and second example, respectively, of elements of an alternate embodiment of the computation module.
Figure 8B:
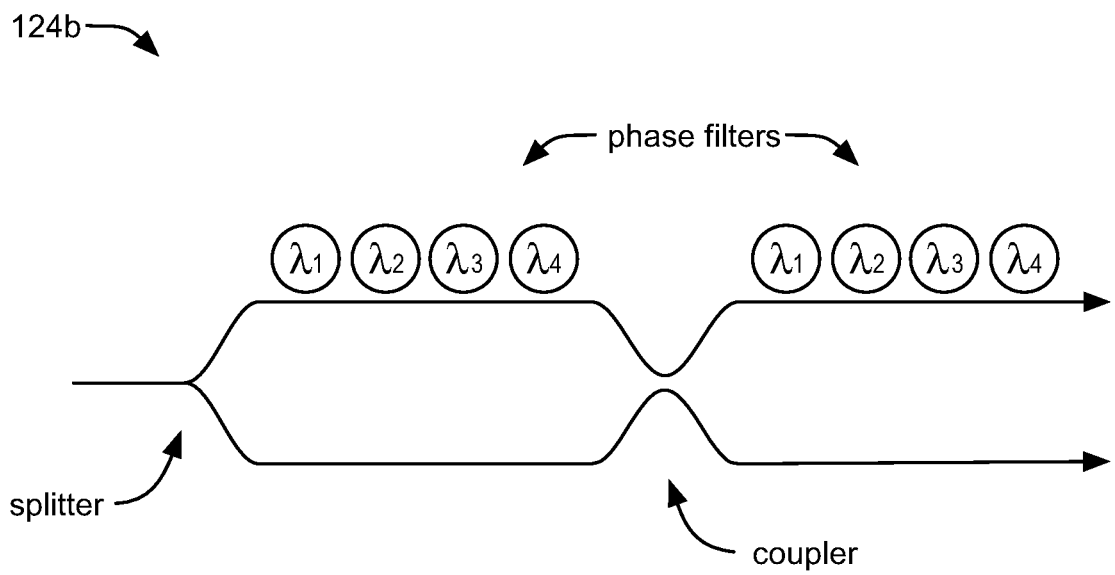

In some such embodiments, multiple matrix operations (e.g., using matrices of smaller size than the desired matrix, such as matrices limited in size to the number of wavelengths) can be performed, producing an equivalent result as the desired matrix operation. In such embodiments, to implement a matrix operation (e.g., matrix-vector multiplication $M \cdot \vec{a}$) using a N×KL matrix M (e.g., wherein N mod K=0), for each of the L optical characteristic channels (e.g., wavelengths), denoted as $\lambda_i$ for $0 \leq i < L$, the K input streams are preferably mapped to N output waveguides, corresponding to an N×K matrix $M_{\lambda_i}$. Based on the desired N×K matrix, the method can include determining (e.g., using singular value decomposition, preferably a reduced SVD such as the thin SVD) two unitary matrices, $U_{\lambda_i}$ and $V_{\lambda_i}$, and a diagonal matrix, $\Sigma_{\lambda_i}$, wherein $M_{\lambda_i} = U_{\lambda_i} \Sigma_{\lambda_i} V_{\lambda_i}^*$, where $V_{\lambda_i}^*$ is the conjugate transpose of $V_{\lambda_i}$. For example (e.g., using the thin SVD), $U_{\lambda_i}$ can be an N×K unitary matrix, $\Sigma_{\lambda_i}$ can be a K×K diagonal matrix, and $V_{\lambda_i}$ can be a K×K unitary matrix. In one example, a series of optical elements are used to first calculate $\vec{b} = V^* \cdot a$, then calculate $\vec{c} = \Sigma \cdot \vec{b} = \Sigma V^* \cdot \vec{a}$, and finally calculate the desired result, $\vec{d} = U \cdot \vec{c} = U \Sigma V^* \cdot \vec{a} = M \cdot \vec{a}$, wherein d is determined by outputting each of the N separate multi-channel (e.g., WDM) paths resulting from multiplication by U to a different detector (e.g., photodetector), each of which sums the L channels of the output into a single value, corresponding to an element of $\vec{d}$. The unitary matrices can, for example, be implemented optically using one or more of a variety of decomposition techniques (e.g., as described in William R. Clements, Peter C. Humphreys, Benjamin J. Metcalf, W. Steven Kolthammer, and Ian A. Walmsley, "Optimal design for universal multiport interferometers," Optica 3, 1460-1465 (2016), the entirety of which is incorporated herein by this reference; similar to the description of Clements et al., but optically implementing an N×K unitary matrix, wherein K<N, by implementing an N×N unitary matrix such as described in Clements et al., and providing the appropriate input signals to K of the N input waveguides, while providing no input signal to the remaining N−K input waveguides and/or not including any waveguides that carry substantially no optical power). The diagonal matrix is preferably implemented using modulators on each waveguide, which can be of any form (e.g., as described above regarding the system, such as regarding the spectral filter banks and/or any other suitable elements of the computation module). In some variations, one or more of the matrices (e.g., the unitary matrices) are implemented using one or more MZIs 124, preferably MZIs including one or more phase weight banks (e.g., inside and/or outside the interferometer), such as dual-input MZIs 124a (e.g., as shown in FIG. 8A) and/or single-input MZIs 124b (e.g., as shown in FIG. 8B).

Figure 8C:
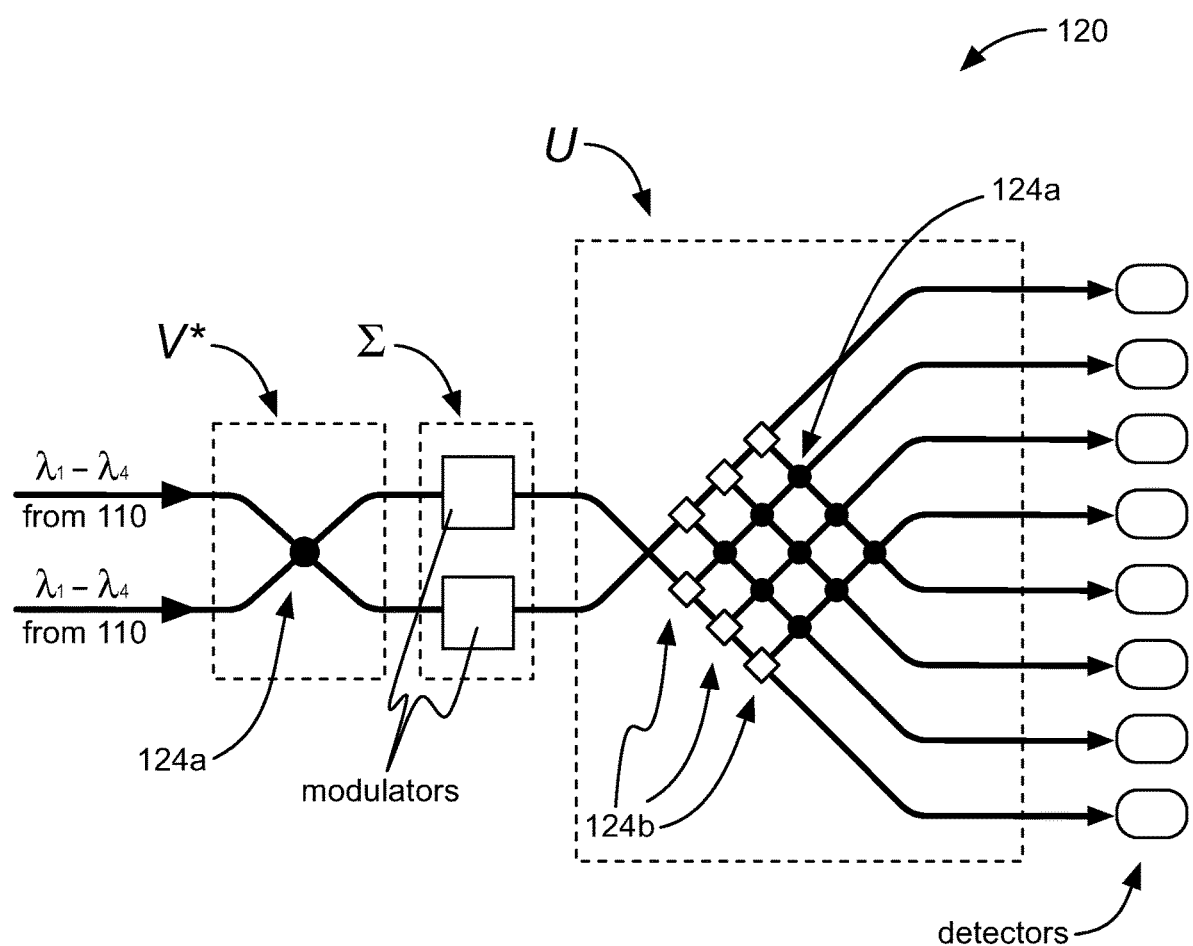
FIG. 8C is a schematic representation of an example of an alternate embodiments of the computation module.

In one example (e.g., as shown in FIG. 8C), in which the computation module 120 includes 4 wavelengths and 2 input waveguides, an 8×8 matrix is divided into a unitary 8×2 matrix (U), a diagonal 2×2 matrix (E), and a unitary 2×2 matrix (V). In this example, the computation module includes a plurality of MZIs, such as wherein each phase weight bank includes a MZI that includes phase weight banks inside and outside the interferometer. For each wavelength, this component can implement a 2×2 unitary matrix operation (e.g., for a matrix belonging to the SU(2) Lie group) for each wavelength, preferably independently and simultaneously (or substantially concurrently), but additionally or alternatively, at different times and/or having any suitable interdependence. A person of skill in the art will recognize that this configuration can be extended to any other suitable number of wavelengths and/or input waveguides.

However, the computation module can additionally or alternatively include any other suitable elements in any suitable arrangement.

1.3 Control Module

The control module 130 preferably functions to control and/or receive outputs from the other elements of the system. The control module preferably controls (e.g., provides electrical control signals to) the transducers of the input module and/or the spectral filter banks (e.g., the modulators) of the computation module. The control module preferably receives outputs (e.g., electrical signals) from the detectors. The control of the transducers, filters and/or other elements can optionally be altered based on the received outputs.

The control module can include, for example, one or more one or more processors, preferably electronic processors (e.g., CPU, GPU, microprocessor, FPGA, ASIC, etc.), storage elements (e.g., RAM, flash, magnetic disk drive, etc.), look up tables, serializers, deserializers, digital to analog converters (e.g., which can function to generate control signals for the transducers, filters, and/or other controlled elements), analog to digital converters (e.g., which can function to encode the detector output signals), and/or any other suitable elements.

However, the system can additionally or alternatively include any other suitable elements in any suitable arrangement.

1.4 Material Platforms

The system can include (e.g., be made of) any suitable materials. The system (and/or elements thereof, such as some or all of the photonic elements) can be implemented on one or more material platforms, such as photonic integrated circuit platforms (e.g., silicon photonics platforms, zero-change photonic platforms, other photonic platforms, etc.), microelectronic platforms, and/or any other suitable material platforms. In some examples, the system is fabricated via co-integration (e.g., between electronics and photonics), such as wherein different elements of the system can be joined together using one or more packaging technologies such as flip chip bonding, wafer bonding (e.g., direct bonding interface), through-oxide vias (TOVs), through-silicon vias (TSVs), metal bonding, and/or any other suitable bonding interfaces.

In one embodiment, the system can include elements implemented in a silicon photonics platform (e.g., implemented by one or more foundries such as APSUNY, IME, IMEC, GlobalFoundries, TSMC, etc.), which can include silicon, silicon doping, silicon oxides, passive silicon components (e.g., waveguides, filters, etc.), and/or germanium-based elements (e.g., detectors, filters and/or modulators, such as EAM modulators, etc.). Additionally or alternatively, the system can include elements implemented in one or more III-V platforms (e.g., JePPiX consortium SMART Photonics and/or HHI platforms, Infinera, AIM Photonics, etc.), which can include materials such as indium compounds, phosphide compounds, gallium compounds, arsenide compounds, and/or any other suitable III-V semiconductors (e.g., InP substrate with InGaAsP features). In an example of this embodiment, the emitters (e.g., laser array) are fabricated in the III-V semiconductor platform, the multiplexer is fabricated in either the III-V semiconductor platform or the silicon photonics platform, and substantially all other photonic elements of the system (e.g., except some or all waveguides associated with the emitters) are fabricated in the silicon photonics platform. In some examples, the elements can be co-integrated with elements implemented in an electronics platform (e.g., integrated such as described above regarding packaging technologies). In some such examples, one or more electronic elements (e.g., transistors) are fabricated in the photonics platform rather than the electronics platform (e.g., thereby enabling and/or facilitating use of high-voltage elements that exceed the voltage limits of the electronics platform). For example, in a system in which elements from a 7 nm electronics platform (e.g., with a 0.7 V limit) are coupled with elements from a silicon photonics platform, the silicon photonics platform elements can include transistors (e.g., configured to amplify signals received from the electronics platform elements) operating with voltages in excess of the electronics platform limit.

The system can additionally or alternatively include elements implemented in a zero-change silicon photonics platform (e.g., platform typically used for microelectronics), preferably wherein some or all photonic and electronic elements of the system are implemented monolithically (e.g., collocated in the same integrated circuit). Additionally or alternatively, the systems can include elements implemented in a co-integrated electronic and photonic platform, such as one that includes front-end-of-line (FEOL) modifications to a standard microelectronic fabrication process and/or back-end-of-line (BEOL) modifications for the fabrication of integrated photonic components (e.g., with low capacitance links to the electronics).

The system can additionally or alternatively include elements implemented in a hybrid silicon/III-V photonics platform, such as wherein silicon photonics elements and III-V photonics elements (e.g., optical amplifiers, laser sources, etc.) are implemented monolithically (e.g., collocated in the same integrated circuit). For example, a III-V semiconductor substrate (e.g., InP) can support both the silicon photonics elements and III-V photonics elements.

The system can additionally or alternatively include elements implemented in a silicon nitride photonics platform (e.g., JePPiX consortium TriPLeX platform), such as including waveguides defined by silicon nitride within a silicon oxide.

The system can additionally or alternatively include elements implemented in a silicon-graphene photonics platform, such as wherein one or more photonic elements (e.g., active elements, such as detectors, filters, modulators, etc.) are implemented using graphene, other graphitic materials, and/or other 2-D materials.

The system can additionally or alternatively include elements implemented in a lithium niobate photonics platform, which can include one or more photonic elements implemented using lithium niobate, such as thin-film lithium niobate.

In a specific example, the system includes elements fabricated such as described in U.S. Pat. No. 10,009,135, issued 26 Jun. 2018 and titled "System and Method for Photonic Processing", which is hereby incorporated in its entirety by this reference (e.g., as described regarding fabrication on silicon-on-insulator wafers).

A person of skill in the art will recognize that the elements described herein using the term "waveguide" can additionally or alternatively include any other suitable optical paths and/or elements associated with optical paths (including, without limitation, free-space paths and/or paths including free-space segments).

However, the system can additionally or alternatively be implemented in any other suitable material platform, and can additionally or alternatively include any other suitable materials.

2. Method

Figure 9:
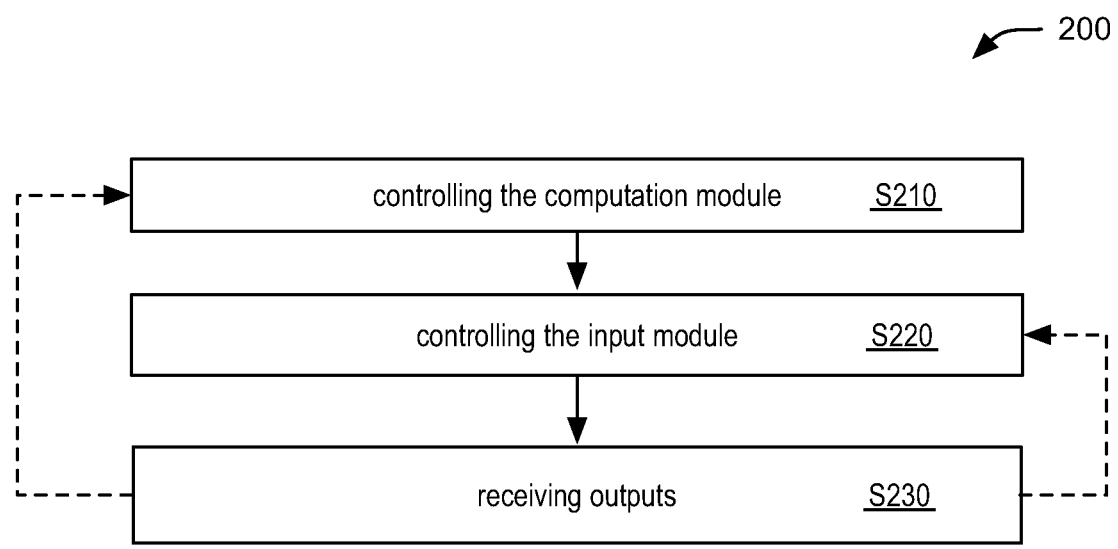
FIG. 9 is a schematic representation of an embodiment of the method.

A method 200 is preferably implemented using the system 100 described above, but can additionally or alternatively be implemented using any other suitable system(s). The method preferably includes: controlling the computation module S210; controlling the input module S220; and/or receiving outputs from the computation module S230 (e.g., as shown in FIG. 9).

In some embodiments, the method 200 includes one or more elements such as described in U.S. Pat. No. 10,009,135, issued 26 Jun. 2018 and titled "System and Method for Photonic Processing", which is hereby incorporated in its entirety by this reference (e.g., implementing the method of U.S. Pat. No. 10,009,135 using the system 100 described herein). However, the method can additionally or alternatively include any other suitable elements.

Controlling the computation module S210 preferably includes controlling one or more of the spectral filter banks, more preferably controlling all the spectral filter banks. For example, S210 can include applying control voltages to one or more optical filters, thereby controlling the optical filters' interaction with the optical signal (e.g., defining the matrix by which the input vector is multiplied).

Controlling the input module S220 preferably includes controlling one or more transducers to emit light (e.g., light encoding an input signal, such as the input vector). The emitted light preferably propagates through the computation module, thereby causing the desired calculation to be performed (e.g., multiplying the input vector by the matrix). In one example, the emitted light interacts with the spectral filter banks, thereby being filtered (e.g., according to the spectral filter weights associated with the matrix), and is then sampled by the detectors generating an output signal.

Receiving outputs from the computation module S230 preferably functions to sample the results of the computation. The outputs are preferably received from the detectors, but can additionally or alternatively be received from any other suitable elements. In a first embodiment, data associated with the received outputs is stored. For example, an analog electrical signal (e.g., signal generated at the detector, signal derived from one or more detector signals, such as described below, etc.) can be converted to a digital signal, optionally transformed into a derived signal (e.g., as described below), and stored in a storage element of the control module (e.g., RAM). Generating a derived signal can include, for example, combining (e.g., adding or subtracting) signals from multiple detectors, applying one or more functions (e.g., nonlinear functions) to the signal(s), and/or any other suitable signal transformations. The derived signals can be generated in the analog domain and/or in the digital domain. In a second embodiment, the received outputs are used to drive one or more transducers (e.g., transducers of the same input module, of another input module, etc.). For example, the received outputs can be used to drive transducers such as described in U.S. Pat. No. 10,009,135, issued 26 Jun. 2018 and titled "System and Method for Photonic Processing", which is hereby incorporated in its entirety by this reference (e.g., as described regarding FIG. 2 of U.S. Pat. No. 10,009,135). In a third embodiment, the generated and/or derived signal can be re-modulated (e.g., onto a different wavelength) and transmitted into a photonic computing element (e.g., in the same portion of the chip, a different portion of the chip, a different chip, etc.). However, the outputs can additionally or alternatively be received and/or used in any other suitable manner.

The method 200 preferable includes repeating S220 (e.g., changing the signal encoded by the emitted light during each such repetition). While repeating S220, the method preferably includes substantially maintaining the same spectral filter bank control. However, the method can alternatively include changing the filter bank control (e.g., encoding a new matrix) between (and/or during) different repetitions of S220. The method preferably includes continuing to perform S230 throughout the repetitions of S220 (e.g., receiving the outputs associated with each repetition of S220).

Repeating S220 can function to enable rapid computation based on many different input signals. In some examples, S220 is repeated at a rate of 20 GS/s (e.g., 20 billion different input signals per second), 10 GS/s, 5 GS/s, 2.5 GS/s, 1 GS/s, 0.5-2 GS/s, 2-8 GS/s, 8-32 GS/s, and/or any other suitable rate. In a specific example, in which the system includes 256 channels (e.g., 256 emitters) and each channel encodes a 4-bit signal (e.g., 4 mantissa bits), a repetition rate of 5 or 10 GS/s can result in an input signal rate of over 5 or 10 Tbit/s, respectively.

Figure 7B:
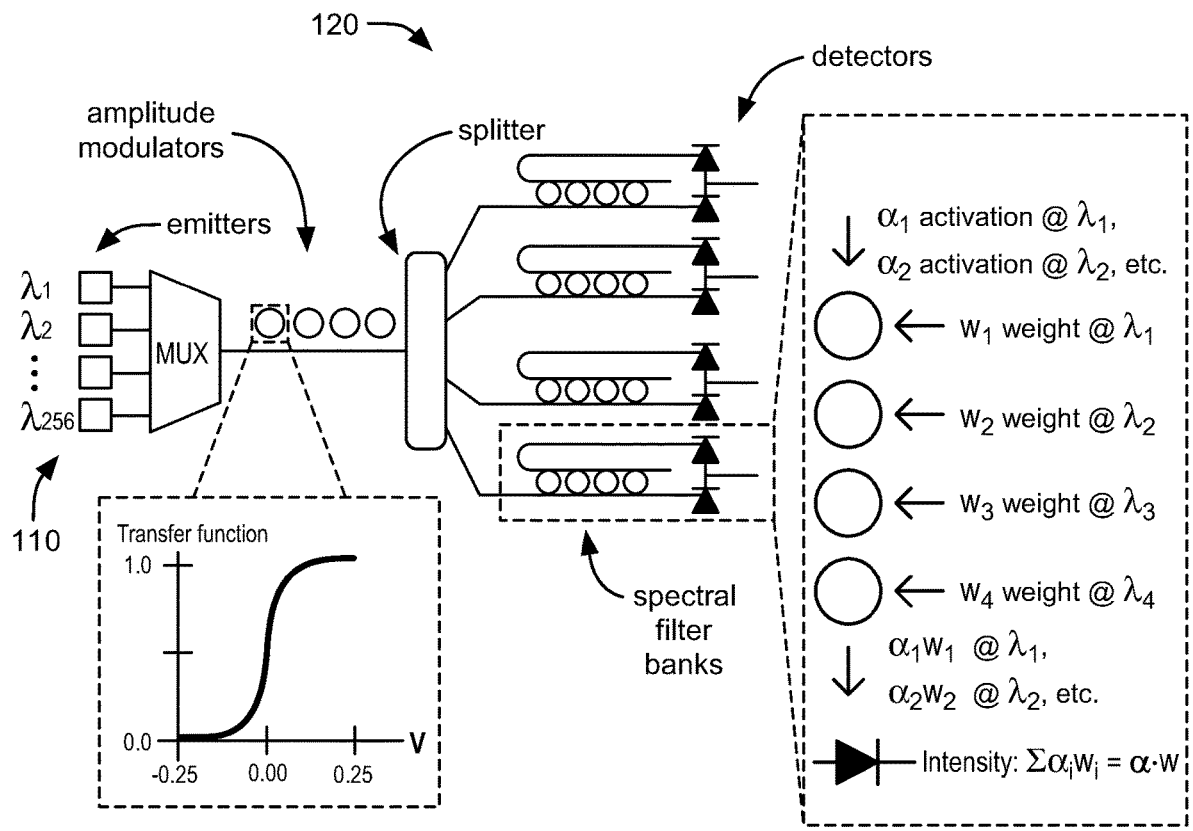

In one example, S210 and/or S220 are performed such as shown in FIG. 7B. Although FIG. 7B depicts specific examples of various elements of the input module 110 (e.g., transducers such as emitters, filters, and/or modulators) and computation module 120 (e.g., spectral filter banks, detectors, etc.), a person of skill in the art will recognize that the S210 and/or S220 could additionally or alternatively be performed using a system with any other suitable examples of these elements (e.g., as described above regarding the system 100).

In embodiments in which the method is limited to performing matrix operations at B bits of precision for a weight bank, the method can optionally include enhancing some or all such operations to a higher level of precision by using multiple weight banks, such as M·B bits of precision for $M^2$ weight banks (e.g., wherein M is a positive integer). In one example, in which M=2, wherein $x_Q$ represents signal x at Q bits of precision, and $x_Q(i)$ represents the ith most significant set of Qbits of a higher-precision representation of $x_Q$:

$$\Sigma w_{2B} x_{2B} = \Sigma [w_B + w_{B(2)}/2^B)(x_B + x_{B(2)}/2^B] = \Sigma w_B x_B + 1/2^B (\Sigma w_B x_{B(2)} + \Sigma w_{B(2)} x_B) + 1/2^{2B} w_{B(2)} x_{B(2)}$$

wherein $x_Q$ refers to signal x at Q bits of precision, and the sums are taken over all optical channels (e.g., wavelengths). Each of the $M^2$ terms is preferably implemented using a separate weight bank (and/or using the same weight bank at separate times, such as consecutive times), and the detector outputs from the different weight banks (and/or different calculation iterations using the same weight bank) are preferably summed digitally (e.g., by the control module), but can additionally or alternatively be summed (and/or otherwise combined) in any other suitable manner.

In alternate embodiments, the method includes performing matrix operations (e.g., matrix multiplication, such as vector-matrix multiplication) for matrices of sizes greater than the number of wavelengths (e.g., the number of transducers) of the system (e.g., as described above regarding alternate embodiments of the computation module 120), such as shown by way of example in FIG. 8C. The process of computing such matrix operations (and/or any suitable elements thereof) is preferably performed for each wavelength and/or other optical channel (e.g., L different times for an L-channel system), more preferably wherein the procedure is performed concurrently (or substantially concurrently) for all L optical channels (e.g., by concurrently providing optical inputs associated with each channel and controlling filter elements associated with each channel). The result can optionally be translated to a set of control signals (e.g., voltage values) on a series of wavelength-selective elements (e.g., phase modulator elements) and/or amplitude modulators, and/or can be used in any other suitable manner (e.g., as described above in more detail, such as regarding S230).

However, the method can additionally or alternatively include any other suitable elements performed in any suitable manner.

An alternative embodiment preferably implements the some or all of above methods in a computer-readable medium storing computer-readable instructions. The instructions are preferably executed by computer-executable components preferably integrated with a communication routing system. The communication routing system may include a communication system, routing system and a pricing system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

I claim:

1. A method for optical modulation comprising:
   receiving light having a first wavelength and a second wavelength;
   splitting the light onto a first path and a second path, the light on the first path and the light on the second path each having the first wavelength and the second wavelength; and
   at a spectral filter bank arranged along the first path, modulating light on at least one of the first path or the second path, comprising:
      controlling a first wavelength-selective filter of the spectral filter bank such that light having the first wavelength is phase shifted by a first phase shift amount; and
      controlling a second wavelength-selective filter of the spectral filter bank such that light having the second wavelength is phase shifted by a second phase shift amount different from the first phase shift amount;
   downstream of the first and second wavelength-selective filters, optically coupling the light on the first and second paths to generate a wavelength-multiplexed optical output signal defining a plurality of wavelength channels; and
   outputting the wavelength-multiplexed optical output signal;
   wherein the first wavelength-selective filter is optically coupled to the first path and not to the second path, wherein the second wavelength-selective filter is optically coupled to the second path and not to the first path.

2. The method of claim 1, wherein the light on the first path and the light on the second path each further has a third wavelength, wherein modulating light on at least one of the first path or the second path further comprises controlling a third wavelength-selective filter of the spectral filter bank such that light having the third wavelength is phase shifted by a third phase shift amount different from the first and second phase shift amounts.

3. The method of claim 1, wherein optically coupling the light on the first and second paths to generate the wavelength-multiplexed optical output signal comprises optically coupling the first and second paths via a directional coupler.

4. A method for optical modulation comprising:
   receiving light having a first wavelength and a second wavelength;
   splitting the light onto a first path and a second path, the light on the first path and the light on the second path each having the first wavelength and the second wavelength; and
   at a spectral filter bank arranged along the first path, modulating light on at least one of the first path or the second path, comprising:
      controlling a first wavelength-selective filter of the spectral filter bank such that light having the first wavelength is phase shifted by a first phase shift amount; and
      controlling a second wavelength-selective filter of the spectral filter bank such that light having the second wavelength is phase shifted by a second phase shift amount different from the first phase shift amount;
   downstream of the first and second wavelength-selective filters, optically coupling the light on the first and second paths to generate a wavelength-multiplexed optical output signal defining a plurality of wavelength channels; and
   outputting the wavelength-multiplexed optical output signal;
   wherein controlling the first wavelength-selective filter such that light having the first wavelength is phase shifted by the first phase shift amount and controlling the second wavelength-selective filter such that light having the second wavelength is phase shifted by the second phase shift amount are performed substantially concurrently; and
   wherein modulating light on at least one of the first path or the second path further comprises, after controlling the first wavelength-selective filter such that light having the first wavelength is phase shifted by the first phase shift amount and controlling the second wavelength-selective filter such that light having the second wavelength is phase shifted by the second phase shift amount: controlling the first wavelength-selective filter such that light having the first wavelength is phase shifted by a third phase shift amount substantially different from the first phase shift amount.

5. The method of claim 4, wherein the first and second wavelength-selective filters are optically coupled to the first path and not to the second path.

6. The method of claim 4, wherein modulating light on at least one of the first path or the second path further comprises, substantially concurrent with controlling the first wavelength-selective filter such that light having the first wavelength is phase shifted by the third phase shift amount, controlling the second wavelength-selective filter such that light having the second wavelength is phase shifted by a fourth phase shift amount substantially different from the second phase shift amount.

7. The method of claim 6, wherein modulating light on at least one of the first path or the second path further comprises, after controlling the first wavelength-selective filter such that light having the first wavelength is phase shifted by the third phase shift amount and controlling the second wavelength-selective filter such that light having the second wavelength is phase shifted by the fourth phase shift amount:
    controlling the first wavelength-selective filter such that light having the first wavelength is phase shifted by a fifth phase shift amount substantially different from the first and third phase shift amounts; and
    substantially concurrent with controlling the first wavelength-selective filter such that light having the first wavelength is phase shifted by the fifth phase shift amount, controlling the second wavelength-selective filter such that light having the second wavelength is phase shifted by a sixth phase shift amount substantially different from the second and fourth phase shift amounts.

8. The method of claim 7, wherein the light on the first path and the light on the second path each further has a third wavelength, wherein modulating light on at least one of the first path or the second path further comprises:
    substantially concurrent with controlling the first wavelength-selective filter such that light having the first wavelength is phase shifted by the first phase shift amount and controlling the second wavelength-selective filter such that light having the second wavelength is phase shifted by the second phase shift amount: controlling a third wavelength-selective filter of the spectral filter bank such that light having the third wavelength is phase shifted by a seventh phase shift amount;
    substantially concurrent with controlling the first wavelength-selective filter such that light having the first wavelength is phase shifted by the third phase shift amount and controlling the second wavelength-selective filter such that light having the second wavelength is phase shifted by the fourth phase shift amount: controlling a third wavelength-selective filter of the spectral filter bank such that light having the third wavelength is phase shifted by an eighth phase shift amount; and
    substantially concurrent with controlling the first wavelength-selective filter such that light having the first wavelength is phase shifted by the fifth phase shift amount and controlling the second wavelength-selective filter such that light having the second wavelength is phase shifted by the sixth phase shift amount: controlling a third wavelength-selective filter of the spectral filter bank such that light having the third wavelength is phase shifted by a ninth phase shift amount.

9. A method for optical modulation comprising:
    receiving light having a first wavelength and a second wavelength;
    splitting the light onto a first path and a second path, the light on the first path and the light on the second path each having the first wavelength and the second wavelength; and
    at a spectral filter bank arranged along the first path, modulating light on at least one of the first path or the second path, comprising:
        controlling a first wavelength-selective filter of the spectral filter bank such that light having the first wavelength is phase shifted by a first phase shift amount; and
        controlling a second wavelength-selective filter of the spectral filter bank such that light having the second wavelength is phase shifted by a second phase shift amount different from the first phase shift amount;
    downstream of the first and second wavelength-selective filters, optically coupling the light on the first and second paths to generate a wavelength-multiplexed optical output signal defining a plurality of wavelength channels; and
    outputting the wavelength-multiplexed optical output signal;
wherein modulating light on at least one of the first path or the second path is performed such that each wavelength channel of the wavelength-multiplexed optical output signal is encoded based on a pulse-amplitude modulation encoding.

10. The method of claim 9, wherein the pulse-amplitude modulation encoding is a PAM-4 encoding.

11. A method for optical modulation comprising:
    receiving light having a first wavelength and a second wavelength;
    splitting the light onto a first path and a second path, the light on the first path and the light on the second path each having the first wavelength and the second wavelength; and
    at a spectral filter bank arranged along the first path, modulating light on at least one of the first path or the second path, comprising:
        controlling a first wavelength-selective filter of the spectral filter bank such that light having the first wavelength is phase shifted by a first phase shift amount; and
        controlling a second wavelength-selective filter of the spectral filter bank such that light having the second wavelength is phase shifted by a second phase shift amount different from the first phase shift amount;
    downstream of the first and second wavelength-selective filters, optically coupling the light on the first and second paths to generate a wavelength-multiplexed optical output signal defining a plurality of wavelength channels; and
    outputting the wavelength-multiplexed optical output signal;
wherein modulating light on at least one of the first path or the second path is performed such that each wavelength channel of the wavelength-multiplexed optical output signal is encoded based on a non-return-to-zero encoding.

12. A method for optical modulation comprising:
    receiving light having a first wavelength and a second wavelength;
    splitting the light onto a first path and a second path, the light on the first path and the light on the second path each having the first wavelength and the second wavelength; and
    at a spectral filter bank arranged along the first path, modulating light on at least one of the first path or the second path, comprising:
        controlling a first wavelength-selective filter of the spectral filter bank such that light having the first wavelength is phase shifted by a first phase shift amount; and
        controlling a second wavelength-selective filter of the spectral filter bank such that light having the second wavelength is phase shifted by a second phase shift amount different from the first phase shift amount;
    downstream of the first and second wavelength-selective filters, optically coupling the light on the first and second paths to generate a wavelength-multiplexed optical output signal defining a plurality of wavelength channels; and outputting the wavelength-multiplexed optical output signal;

wherein:

the first wavelength-selective filter comprises a first microresonator; and the second wavelength-selective filter comprises a second microresonator.

13. The method of claim 12, wherein the first microresonator is a microdisk resonator.

14. The method of claim 12, wherein the second wavelength-selective filter further comprises a third microresonator.

15. The method of claim 14, wherein the second microresonator defines a second resonance wavelength, wherein the third microresonator defines a third resonance wavelength substantially equal to the second resonance wavelength.

16. The method of claim 15, wherein the second resonance wavelength is substantially equal to the second wavelength.

17. The method of claim 14, wherein the second microresonator is optically coupled to the first path, wherein the third microresonator is optically coupled to the first path via the second microresonator.

18. The method of claim 12, wherein:

controlling the first optical filter comprises altering a first resonance wavelength of the first microresonator; and controlling the second optical filter comprises altering a second resonance wavelength of the second microresonator.

* * * * *